US009973960B2

(12) United States Patent
Rangaswamy

(10) Patent No.: US 9,973,960 B2
(45) Date of Patent: May 15, 2018

(54) DYNAMIC SELECTION AND MONITORING OF WIRELESS COMMUNICATION INTERFACES FOR CELLULAR WIRELESS ACCESS DATA OFFLOAD IN A WIRELESS ACCESS NETWORK

(71) Applicant: Sooktha Consulting Private Limited, Bangalore (IN)

(72) Inventor: Balaji Rangaswamy, Bangalore (IN)

(73) Assignee: SOOKTHA CONSULTING PRIVATE LIMITED, Bangalore, Karnataka (IN)

( * ) Notice: Subject to any disclaimer, the term of this patent is extended or adjusted under 35 U.S.C. 154(b) by 148 days.

(21) Appl. No.: 15/180,098

(22) Filed: Jun. 13, 2016

(65) Prior Publication Data

US 2017/0295512 A1    Oct. 12, 2017

(51) Int. Cl.
*H04W 48/20* (2009.01)
*H04W 28/02* (2009.01)
(Continued)

(52) U.S. Cl.
CPC ... *H04W 28/0205* (2013.01); *H04W 52/0212* (2013.01); *H04W 52/0238* (2013.01);
(Continued)

(58) Field of Classification Search
CPC ..... H04W 28/08; H04W 84/12; H04W 24/10; H04W 36/18; H04W 36/22; H04W 48/20; H04W 72/0486; H04W 72/085; H04W 76/025; H04W 84/18; H04W 88/08; H04W 88/10; H04W 88/06
See application file for complete search history.

(56) References Cited

U.S. PATENT DOCUMENTS 7,321,571 B2    1/2008    Schnack et al.
8,451,752 B2    5/2013    Lu
(Continued)

FOREIGN PATENT DOCUMENTS

IN    2086/DELNP/2015    3/2014

*Primary Examiner* — Mohamed Kamara
(74) *Attorney, Agent, or Firm* — Ash Tankha; Lipton, Weinberger & Husick

(57) ABSTRACT

A method and a wireless access interface selection and monitoring system (WAISMS) for dynamically selecting and monitoring wireless communication interfaces (WCIs) associated with wireless access points (WAPs) in a wireless access network for offloading data from a cellular wireless communication (CWC) interface in a CWC network to the selected WCIs are provided. The WAISMS generates and dynamically updates network latency information (NLI) by measuring latency on a cellular wireless network interface and the WCIs based on network node information received from the WAPs. The WAISMS receives and processes a request from a cellular wireless access data offload system (CWADOS), selects a first WCI (FWCI) and a second WCI (SWCI) based on predetermined interface selection criteria and interface selection information, generates and transmits a notification of the selected FWCI and SWCI to the CWADOS for offloading data packets, iteratively monitors the WCIs, and dynamically updates the NLI for selecting subsequent WCIs.

27 Claims, 6 Drawing Sheets

(51) Int. Cl.
*H04W 72/12* (2009.01)
*H04W 52/02* (2009.01)
*H04W 84/12* (2009.01)

(52) U.S. Cl.
CPC ... *H04W 52/0245* (2013.01); *H04W 72/1231* (2013.01); *H04W 84/12* (2013.01)

(56) References Cited

U.S. PATENT DOCUMENTS

| | | |
|---|---|---|
| 8,879,416 B2 | 11/2014 | Mishra et al. |
| 9,113,352 B2 | 8/2015 | Agarwal et al. |
| 2010/0240369 A1* | 9/2010 | Law ............... H04W 36/30 455/436 |
| 2010/0278158 A1* | 11/2010 | Lee ............... H04W 48/20 370/338 |
| 2014/0071870 A1 | 3/2014 | Abraham et al. |
| 2014/0079022 A1 | 3/2014 | Wang et al. |
| 2014/0204771 A1* | 7/2014 | Gao ............... H04W 36/28 370/252 |
| 2014/0376473 A1 | 12/2014 | Leng et al. |
| 2015/0124601 A1* | 5/2015 | Li ............... H04W 28/08 370/230 |
| 2015/0208319 A1* | 7/2015 | Kim ............... H04W 48/00 455/513 |
| 2015/0223114 A1 | 8/2015 | Tian et al. |
| 2015/0281020 A1 | 10/2015 | Yun et al. |
| 2016/0219481 A1* | 7/2016 | Wang ............... H04W 28/085 |

\* cited by examiner

DYNAMIC SELECTION AND MONITORING OF WIRELESS COMMUNICATION INTERFACES FOR CELLULAR WIRELESS ACCESS DATA OFFLOAD IN A WIRELESS ACCESS NETWORK

CROSS-REFERENCE TO RELATED APPLICATIONS

This application claims priority to and the benefit of the non-provisional patent application number 201641012743 titled "Dynamic Selection And Monitoring Of Wireless Communication Interfaces For Cellular Wireless Access Data Offload In A Wireless Access Network", filed in the Indian Patent Office on Apr. 12, 2016. The specification of the above referenced patent application is incorporated herein by reference in its entirety.

BACKGROUND

Following the introduction of long term evolution (LTE) technology, which is marketed as an advanced fourth generation mobile cellular network technology, there is an increased demand for wirelessly accessing internet resources. There is also an increase in the number of mobile broadband devices, for example, smartphones, feature phones, tablets, etc., used for accessing the internet resources. The increased demand to access the internet resources and to service the increased number of mobile broadband devices has led to network congestion and deterioration of network quality. Network congestion results, for example, from signalling overload and data overload on a cellular wireless communication network. The signalling overload results from polling of the cellular wireless communication network by the mobile broadband devices for updated information related to downloaded applications. The data overload results from proliferation of mobile broadband devices and unlimited mobile data bundles offered by cellular network operators. Moreover, increased data traffic on the cellular wireless communication network poses challenges to a backhaul between a base station and the cellular wireless communication network.

Measures are implemented by cellular network operators to ensure resilience of cellular wireless communication networks to cope with the increasing demand of data usage from mobile broadband devices. For example, for signalling overload, mechanisms are devised to control the frequency of switching of a mobile broadband device between an idle mode and an active mode. Data offloading is one of the strategies for reducing network congestion to resolve the issue of data overload along with scaling and optimisation of the cellular wireless communication network. Apart from reducing congestion in the cellular wireless communication network, data offloading also provides cost savings on mobile data services and higher bandwidth availability to users. To cater to the explosion in mobile data traffic, there is a need for offloading data from a licensed spectrum to an unlicensed spectrum. Various options for offloading data are available to the cellular network operators. Of the available technologies for data offloading from the cellular wireless communication network, a wireless network that implements Wi-Fi® of Wi-Fi Alliance Corporation, herein referred to as a "Wi-Fi network", is the choice for offloading data as Wi-Fi technology is ubiquitous, implemented on mobile broadband devices, and works on the unlicensed spectrum.

In a typical cellular wireless communication network setup, user devices communicate with core network elements of the cellular wireless communication network via a radio base station to access the internet and intranet for data. A cellular wireless communication interface between the user device and the base station is a wireless wide area network (WWAN) interface, for example, a long term evolution (LTE) interface. Mobile data is transmitted and received in the form of data packets in the cellular wireless communication network. With the increase in the data traffic in the cellular wireless communication network, the base station offloads the data to wireless communication interfaces of the Wi-Fi network, herein referred to as "Wi-Fi interfaces", between user devices and wireless access points of the Wi-Fi network herein referred to as "Wi-Fi access points".

A backhaul between the base station and a core network of the cellular wireless communication network is wired and employs physical media comprising, for example, copper wires, hybrid fiber-coaxial cables, and single-mode and multimode fiber optic cables. There is a need to setup a network where the backhaul may not be available and where it may not be possible to install base stations or wireless access points, for example, Wi-Fi access points at specific locations, for example, emergency public safety networks, stadiums, other venues where a large number of persons are present, and for connecting user devices to the internet where the locations of the user devices make it difficult to install the base station at an optimal location or to have a typical wired backhaul to the core network. With the exponential growth in high speed mobile data traffic, wireless backhaul is preferred by cellular network operators, for example, in emergency public safety networks, stadiums, and other venues where a large number of persons are present, because the wireless backhaul allows base stations to be installed in locations where wired connections are not available. The wireless backhaul results in low operating and maintenance costs to the cellular network operators while providing mobile data services to remote or ad hoc locations. Wireless backhauls utilize wireless solutions, for example, Wi-Fi® and worldwide interoperability for microwave access (WiMAX®) of the WiMAX forum. Wi-Fi backhauls allow multi-hop communication for long distance communication and result in low operating costs. Wi-Fi backhauls are used, for example, where a wired backhaul connection is not feasible and where base station installation or Wi-Fi access point installation is not feasible at certain locations, for example, at stadiums, venues where a large number or persons are present, emergency public safety networks, etc. The recent technology of the internet of things is possible with the Wi-Fi backhaul that allows the base station to be installed closer to the user devices that may be present in inaccessible locations. These user devices may not have battery replacement options and hence require an extended battery life to communicate with the base station. The base station is therefore required to be installed closer to the user devices so that the user devices do not expend a lot of power to transmit data to the base station.

Since the backhaul demands multiple hops over large distances and since installation of base stations at flexible locations is a pressing need, there is a need for deploying wireless access networks, for example, Wi-Fi access networks to address the Wi-Fi backhaul need. In a Wi-Fi access network, multiple Wi-Fi access points are connected to each other over Wi-Fi interfaces in a topology, for example, a mesh topology. These Wi-Fi access points route data packets between user devices and the base station and use a Wi-Fi backhaul to the core network. Wi-Fi access networks, because of their flexible architecture, reduce the investment cost for building infrastructure with Wi-Fi access points that cover areas to be served by cellular network operators. Wi-Fi access networks forward data packets over large distances by splitting the distance into a series of short hops between intermediate nodes, that is, intermediate Wi-Fi access points. The intermediate Wi-Fi access points in the Wi-Fi access network boost the Wi-Fi signal and route data packets in the Wi-Fi access network.

There is a need to address multiple aspects of implementation of offloading mobile data from a cellular wireless communication interface, for example, the long term evolution (LTE) interface, of the cellular wireless communication network to Wi-Fi interfaces associated with Wi-Fi access points of the Wi-Fi access network. One aspect is deployment of Wi-Fi access points outdoors. The cost of developing or leasing infrastructure to deploy Wi-Fi access points affects the installation cost of the Wi-Fi access network and affects the backhaul choice. Another requirement for offloading mobile data from the LTE interface to the Wi-Fi interfaces associated with the Wi-Fi access points of the Wi-Fi access network is seamless switching between the cellular wireless communication network and the Wi-Fi access network and smooth routing of data traffic in the Wi-Fi access network. An additional aspect of concern is battery consumption of user devices located in inapproachable locations for communicating with the base station of the cellular wireless communication network.

Moreover, there are challenges in mechanisms that implement offloading of mobile data from the cellular wireless communication interface to wireless interfaces of a heterogeneous wireless access network. A heterogeneous wireless access network is a wireless access network that employs devices that use different radio access technologies, for example, Wi-Fi®, Bluetooth® of Bluetooth Sig, Inc., etc. These devices act as intermediate nodes in the heterogeneous wireless access network and communicate with each other over heterogeneous wireless interfaces, for example, a Wi-Fi interface, a Bluetooth interface, etc. On using a heterogeneous wireless access network to offload mobile data, the mobility of a user device is constrained and leads to significant delays in data routing. In a heterogeneous wireless access network, user devices are intended to remain in close vicinity to the intermediate nodes, for example, the wireless access points of the heterogeneous wireless access network while using mobile data services, to avoid draining of the battery of each user device. Employing a Wi-Fi access network will counter mobility issues of user devices while offloading mobile data. A Wi-Fi access network operates in a homogeneous manner, where all the intermediate nodes, for example, the Wi-Fi access points within the Wi-Fi access network communicate with each other using a Wi-Fi protocol. In a typical cellular wireless communication network, cellular network operators that manage offloading of the mobile data to Wi-Fi interfaces of the Wi-Fi access network are not aware of traffic conditions on the Wi-Fi interfaces of the Wi-Fi access network. Offloading of mobile data to a Wi-Fi interface with heavy load causes congestion in the Wi-Fi access network. The congestion in the Wi-Fi access network induces latency in routing of data packets between the core network and the user device. This will result in a poor user experience in streaming related applications. To offload and route mobile data from a cellular wireless communication network to a homogeneous Wi-Fi access network, there is a need for a selection mechanism in the Wi-Fi access network that interacts with a data offload system to optimally select wireless communication interfaces, where the selection mechanism possesses knowledge of routes and hops in the Wi-Fi access network and decides on an optimal path to route the mobile data to a destination.

Hence, there is a long felt need for a method and a system for dynamically selecting and monitoring one or more wireless communication interfaces, for example, Wi-Fi interfaces associated with one or more Wi-Fi access points in a Wi-Fi access network for offloading data from a cellular wireless communication interface between a user device and a base station in a cellular wireless communication network to the selected Wi-Fi interfaces in the Wi-Fi access network to meet quality of service requirements of the data. Moreover, there is a need for a method and a system for allowing offloading of data from a cellular wireless communication interface to Wi-Fi interfaces in a Wi-Fi access network by optimally routing the data between nodes, that is, between the Wi-Fi access points in the Wi-Fi access network based on the latency permissible to the data packets being forwarded and the number of hops between intermediate Wi-Fi access points in the Wi-Fi access network required for the forwarded data packets to reach a destination. Furthermore, there is a need for a method and a system for allowing offloading of data from the cellular wireless communication interface in the cellular wireless communication network to the Wi-Fi interfaces in the Wi-Fi access network while supporting mobility of user devices and data offloading due to wide geographical area coverage by the Wi-Fi access network and reducing power consumption of the user devices by using base stations and Wi-Fi access points installed closer to the user devices.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above mentioned need for dynamically selecting and monitoring one or more wireless communication interfaces associated with one or more of multiple wireless access points in a wireless access network for offloading data from a cellular wireless communication interface between a user device and a base station in a cellular wireless communication network to the selected wireless communication interfaces in the wireless access network to meet quality of service requirements of the data. The cellular wireless communication interface is a wireless wide area network (WWAN) interface of the cellular wireless communication network that implements, for example, a long term evolution (LTE) technology, and is herein referred to as an "LTE interface". The wireless access network is a communication network of wireless access points with wireless communication interfaces between the wireless access points. The wireless access network implements, for example, Wi-Fi® of Wi-Fi Alliance Corporation, and is herein referred to as a "Wi-Fi access network". The wireless access points in the Wi-Fi access network are herein referred to as "Wi-Fi access points". The wireless communication interfaces are wireless local area network (WLAN) interfaces that implement, for example, Wi-Fi® of Wi-Fi Alliance Corporation, and are herein referred to as the "Wi-Fi interfaces". The method and the system disclosed herein also perform optimal routing of data between nodes, that is, between the Wi-Fi access points in the Wi-Fi access network based on the latency permissible to the data packets being forwarded and the number of hops between intermediate Wi-Fi access points in the Wi-Fi access network required for the forwarded data packets to reach a destination. Furthermore, the method and the system disclosed herein support mobility of user devices and data offloading due to wide geographical area coverage by the Wi-Fi access network and reduce power consumption of the user devices by using base stations and Wi-Fi access points that may now be installed in locations that are much closer to the user devices, even if a wired connection is not available at those locations.

The method disclosed herein employs a wireless access interface selection and monitoring system (WAISMS) communicatively coupled to a cellular wireless access data offload system (CWADOS) and implemented in a base station of the cellular wireless communication network, for dynamically selecting and monitoring one or more Wi-Fi interfaces associated with one or more Wi-Fi access points in the Wi-Fi access network for offloading data from the long term evolution (LTE) interface between a user device and the base station in the cellular wireless communication network to the selected Wi-Fi interfaces. The WAISMS generates network latency information by measuring latency on a cellular wireless network interface between the base station and a core network of the cellular wireless communication network for each bearer on the LTE interface using one or more network protocol procedures, for example, an internet control message protocol (ICMP) echo procedure. The base station is connected to the core network over the Wi-Fi access network. The cellular wireless network interface is, for example, a user plane of an S1 interface, herein referred to as the "S1-U interface". The WAISMS receives and stores network node information from each of the Wi-Fi access points in the Wi-Fi access network over a wireless communication protocol, for example, a user datagram protocol (UDP), a transmission control protocol (TCP), or an internet protocol (IP). The WAISMS dynamically updates the generated network latency information by measuring latency between the base station and each of the Wi-Fi access points in the Wi-Fi access network using the received and stored network node information and one or more network protocol procedures, for example, the ICMP echo procedure.

The wireless access interface selection and monitoring system (WAISMS) receives and processes a request comprising interface selection information from the cellular wireless access data offload system (CWADOS). The WAISMS selects a first Wi-Fi interface between the user device and a Wi-Fi access point in the Wi-Fi access network, and a second Wi-Fi interface between another Wi-Fi access point and the base station based on predetermined interface selection criteria and the interface selection information for offloading data packets. The WAISMS generates and transmits a notification of the selected first Wi-Fi interface and the selected second Wi-Fi interface to the CWADOS to allow the CWADOS to offload downlink data packets to the selected first Wi-Fi interface via the selected second Wi-Fi interface. The WAISMS iteratively monitors the Wi-Fi interfaces associated with the Wi-Fi access points in the Wi-Fi access network and dynamically updates the network latency information for selecting subsequent wireless communication interfaces in the Wi-Fi access network for offloading the downlink data packets.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
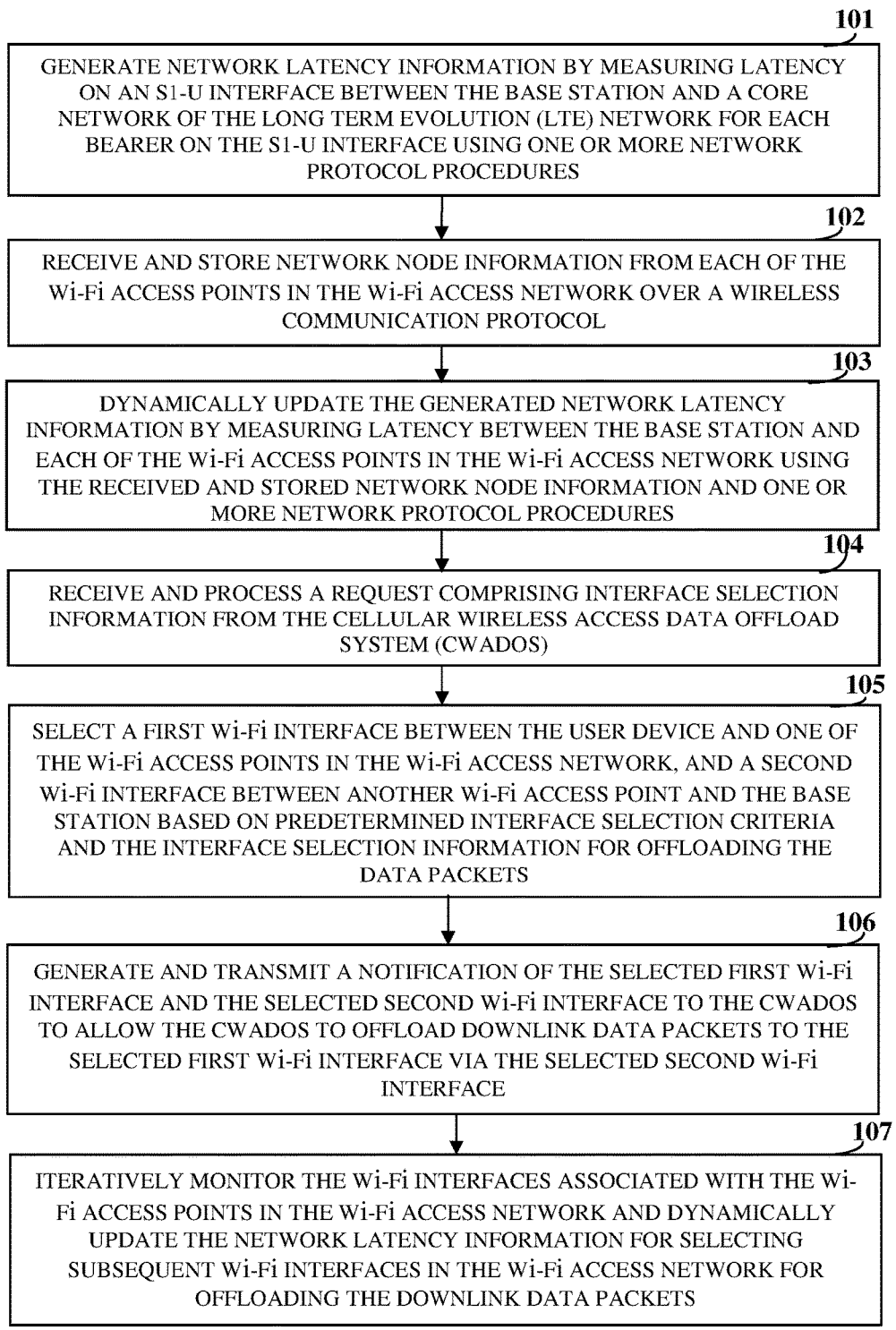
FIG. 1 illustrates a method for dynamically selecting and monitoring one or more wireless communication interfaces associated with one or more of multiple wireless access points in a wireless access network for offloading data from a cellular wireless communication interface between a user device and a base station in a cellular wireless communication network to the selected wireless communication interfaces.

FIG. 1 illustrates a method for dynamically selecting and monitoring one or more wireless communication interfaces associated with one or more of multiple wireless access points in a wireless access network for offloading data from a cellular wireless communication interface between a user device and a base station in a cellular wireless communication network to the selected wireless communication interfaces. As used herein, "wireless communication interfaces"

refer to wireless local area network (WLAN) interfaces that implement, for example, Wi-Fi® of Wi-Fi Alliance Corporation. For purposes of illustration, the wireless communication interfaces are hereafter referred to as "Wi-Fi interfaces". Also, as used herein, "wireless access point" refers to a networking hardware device that allows wireless connections and routing of data between the base station and the user device. The wireless access point implements, for example, Wi-Fi® of Wi-Fi Alliance Corporation, and allows Wi-Fi connections and routing of data between the base station and the user device. For purposes of illustration, the wireless access point is hereafter referred to as a "Wi-Fi access point (Wi-Fi AP)". Also, as used herein, "cellular wireless communication network" refers to a telecommunications network that uses wireless data connections for connecting network nodes, for example, Wi-Fi access points, and enabling telecommunications between the network nodes. The cellular wireless communication network implements, for example, a long term evolution (LTE) technology, and for purposes of illustration, is hereafter referred to as an "LTE network". Also, as used herein, "cellular wireless communication interface" refers to a wireless wide area network (WWAN) interface of the cellular wireless communication network between a user device and a base station of the cellular wireless communication network. The cellular wireless communication interface in the LTE network is hereafter referred to as an "LTE interface". LTE is a wireless communication technology that supports high speed data for user devices, for example, mobile devices, smartphones, etc.

Also, as used herein, "wireless access network" refers to a communications network of wireless nodes, for example, the Wi-Fi access points, organized in a topology to provide wireless data services to user devices. For purposes of illustration, the wireless access network comprising, for example, the Wi-Fi access points, is hereafter referred to as a "Wi-Fi access network". The Wi-Fi access points in the Wi-Fi access network communicate with each other over the Wi-Fi interfaces. The Wi-Fi access points in the Wi-Fi access network can be organized in different network topologies, for example, a fully connected mesh topology, a partially connected mesh topology, a daisy chain topology, and a star topology. The fully connected mesh topology is a network topology where all the Wi-Fi access points of the Wi-Fi access network are connected by direct links. The partially connected mesh topology is a network topology where some Wi-Fi access points in the Wi-Fi access network are connected to more than one other Wi-Fi access point in the Wi-Fi access network with a point-to-point link. The daisy chain topology is a network topology where the Wi-Fi access points in the Wi-Fi access network are connected one after another in a sequence, or a series, or a ring. The star topology is a network topology where the Wi-Fi access points in the Wi-Fi access network are connected to a central Wi-Fi access point.

Also, as used herein, "offloading" comprising, for example, mobile data offloading or Wi-Fi offloading refers to delivering data targeted for cellular wireless communication networks using complementary network technologies, for example, Wi-Fi® of Wi-Fi Alliance Corporation. Also, as used herein, "data" refers to information that is generated, stored, or transmitted in a digital format by a processor capable of executing computer program instructions for processing the information. The data is, for example, mobile data comprising audio data, video data, games, images, applications from the Internet on a mobile device, etc.

For purposes of illustration, the detailed description refers to the wireless communication interfaces, the wireless access points, the wireless access network, the cellular wireless communication interface, and the cellular wireless communication network as the Wi-Fi interfaces, the Wi-Fi access points, the Wi-Fi access network, the long term evolution (LTE) interface, and the LTE network respectively; however the scope of the method and the system disclosed herein is not limited to the wireless communication interfaces, the wireless access points, the wireless access network, the cellular wireless communication interface, and the cellular wireless communication network being the Wi-Fi interfaces, the Wi-Fi access points, the Wi-Fi access network, the long term evolution (LTE) interface, and the LTE network respectively, but may be extended to include other wireless local area network (WLAN) interfaces, wireless access points, wireless access networks, wireless wide area network (WWAN) interfaces, and cellular wireless communication networks respectively.

The method disclosed herein employs a wireless access interface selection and monitoring system (WAISMS) implemented in the base station of the long term evolution (LTE) network for dynamically selecting and monitoring one or more Wi-Fi interfaces associated with one or more of multiple Wi-Fi access points in the Wi-Fi access network for offloading data from an LTE interface between a user device and the base station in the LTE network to the selected Wi-Fi interfaces. In an embodiment, the WAISMS is communicatively coupled to a cellular wireless access data offload system (CWADOS) in the base station. In another embodiment, the WAISMS communicates with the CWADOS positioned external to the base station. The CWADOS offloads data from the LTE interface in the LTE network to Wi-Fi interfaces associated with Wi-Fi access points in the Wi-Fi access network. The base station in the LTE network relays data between the user device and the core network of the LTE network. The base station in the LTE network is an LTE evolved Node B (LTE eNodeB).

In the method disclosed herein and illustrated in FIG. 1, the wireless access interface selection and monitoring system (WAISMS) generates 101 network latency information by measuring latency on a cellular wireless network interface between the base station and the core network of the long term evolution (LTE) network for each bearer on the cellular wireless network interface using one or more network protocol procedures after establishing a bearer on the cellular wireless network interface. As used herein, "cellular wireless network interface" refers to an interface between the base station and the core network in the LTE network and is referred to as a "user plane of an S1 interface". The user plane of an S1 interface is hereafter referred to as an "S1-U interface". Also, as used herein, "bearer", also referred to as a "logical bearer" or a "radio bearer" refers to a carrier of data packets in the LTE network between the user device and the core network. Also, as used herein, "data packets" refers to data in the LTE network that is received and transmitted in the form of packets. Different bearers are used to transmit data packets over different interfaces of the LTE network. A bearer on the LTE interface is, for example, a data radio bearer. A bearer of the S1-U interface is a user plane bearer on the S1 interface, that is, an S1-U bearer. An S1-U bearer corresponds to a general packet radio service (GPRS) tunneling protocol (GTP) tunnel on the S1 interface. Also, as used herein, "latency on the cellular wireless network interface" refers to time taken for a data packet on the cellular wireless network interface in the LTE network to reach a destination, for example, the core network, from a sender, for example, the base station. The base station is connected to the core network over the Wi-Fi access network comprising the Wi-Fi access points, the Wi-Fi interfaces, and the S1-U interface.

The wireless access interface selection and monitoring system (WAISMS) measures the latency on the S1-U interface after a data network connection is established between the user device and the long term evolution (LTE) network by the user device. A bearer for the data network connection in the LTE network is, for example, an evolved radio access bearer. The data network connection in the LTE network is referred herein as a "packet data network (PDN) connection". The PDN connection comprises one or more bearers. An LTE PDN connection has at least one data radio bearer referred to as a "default radio bearer", and in an embodiment, has additional data radio bearers referred to as "dedicated bearers". Each bearer in a data network has a corresponding bearer on the LTE interface. That is, a data radio bearer of the LTE interface has a corresponding evolved radio access bearer. The WAISMS periodically measures the latency on the S1-U interface between the base station and the core network for each S1-U bearer after an S1-U bearer corresponding to an evolved radio access bearer is established.

The latency on the S1-U interface between the base station and the core network for each bearer on S1-U interface constitutes the network latency information. The network protocol procedures comprise, for example, an internet control message protocol (ICMP) echo procedure. The wireless access interface selection and monitoring system (WAISMS) periodically measures the latency on the S1-U interface between the base station and the core network using the ICMP echo procedure. The ICMP echo procedure involves sending an ICMP echo request packet to a destination, for example, a Wi-Fi access point, and receiving an ICMP echo reply from the destination. A sender of the ICMP echo request packet, that is, the WAISMS, measures the time elapsed between sending the ICMP echo request packet and receiving the ICMP echo reply. The time elapsed is referred to as a round-trip-time (RTT). The latency from the WAISMS to the Wi-Fi access point is then assumed to be half of the round-trip-time. For example, the WAISMS originates an ICMP echo request packet to one of the Wi-Fi access points, for example, Wi-Fi access point1 (Wi-Fi AP1) in the Wi-Fi access network between the base station and the core network and starts a timer. The WAISMS receives an ICMP echo reply after 40 milliseconds (ms). Therefore, the round-trip-time is 40 ms and the latency from the base station to the Wi-Fi AP1 is 40/2=20 ms.

The wireless access interface selection and monitoring system (WAISMS) receives and stores 102 network node information from each of the Wi-Fi access points in the Wi-Fi access network over a wireless communication protocol. The network node information is the characteristic information of the wireless nodes, that is, the Wi-Fi access points of the Wi-Fi access network. The network node information comprises, for example, a unique identifier of each of the Wi-Fi access points and a measure of data load on the Wi-Fi interfaces associated with each of the Wi-Fi access points. The wireless communication protocol for communicating with each of the Wi-Fi access points is, for example, a user datagram protocol (UDP), or a transmission control protocol (TCP), or an internet protocol (IP). References to the IP herein comprise a fourth version and a sixth version of the IP. The WAISMS receives the network node information over a designated port when the TCP and the UDP is used for communicating with the Wi-Fi access points, and over a designated protocol type or a designated IP address when the IP is used for communicating with the Wi-Fi access points. The WAISMS periodically, or upon change, receives the network node information from each of the Wi-Fi access points in the Wi-Fi access network.

The wireless access interface selection and monitoring system (WAISMS) dynamically updates 103 the generated network latency information by measuring latency between the base station and each of the Wi-Fi access points in the Wi-Fi access network using the received and stored network node information and one or more network protocol procedures. As used herein, "latency between the base station and each of the Wi-Fi access points" refers to time taken for a data packet on a Wi-Fi interface in the Wi-Fi access network to reach a destination, for example, a Wi-Fi access point in the Wi-Fi access network, from a sender, for example, the base station. The WAISMS periodically, or upon change, measures the latency between the base station and each Wi-Fi access point, for example, using the internet control message protocol (ICMP) echo procedure and the received and stored network node information and updates the generated network latency information.

The wireless access interface selection and monitoring system (WAISMS) receives and processes 104 a request comprising interface selection information from the cellular wireless access data offload system (CWADOS). As used herein, "interface selection information" refers to information pertaining to the selection of the Wi-Fi interfaces in the Wi-Fi access network by the WAISMS. The interface selection information comprises, for example, a list of the Wi-Fi access points, measurements pertaining to each of the Wi-Fi access points, and quality of service requirements of a bearer on the S1-U interface for which the selection of the Wi-Fi interfaces is required. The measurements pertaining to each of the Wi-Fi access points comprise, for example, a received signal strength indicator (RSSI), a signal-to-interference-plus-noise ratio (SINR), number of missed beacons, etc. The quality of service requirements of the bearer on the S1-U interface for which the selection of the Wi-Fi interfaces is required comprise, for example, a guaranteed bit rate, a maximum bit rate, a priority, and a latency budget. The priority is, for example, assigned to each of the data packets to differentiate the data packets based on content transmitted. A high priority data packet is preferred in offloading over a low priority data packet. The WAISMS receives a request from the CWADOS to select Wi-Fi access points and associated Wi-Fi interfaces defining a path for offloading data packets from the long term evolution (LTE) interface in the LTE network to the Wi-Fi interfaces in the Wi-Fi access network.

The wireless access interface selection and monitoring system (WAISMS) selects 105 a first wireless communication interface between the user device and one of the Wi-Fi access points in the Wi-Fi access network, and a second wireless communication interface between another Wi-Fi access point and the base station based on predetermined interface selection criteria and the interface selection information for offloading the data packets. A set of Wi-Fi access points and corresponding Wi-Fi interfaces are visible to the user device. As used herein, the "first wireless communication interface" refers to a wireless local area network (WLAN) interface, for example, a Wi-Fi interface configured to connect a Wi-Fi access point, visible to the user device in the Wi-Fi access network, to the user device, and for purposes of illustration, is hereafter referred to as the "first Wi-Fi interface". The Wi-Fi access point visible to the user device in the Wi-Fi access network is hereafter referred to as a "first Wi-Fi access point". Also, as used herein, "another Wi-Fi access point" refers to a Wi-Fi access point visible to the base station and hereafter referred to as a "second Wi-Fi access point". In an embodiment, the second Wi-Fi access point is the Wi-Fi access point that is also visible to the user device. In an embodiment, the Wi-Fi access points visible to the user device are disjoint from the Wi-Fi access points visible to the base station. Also, as used herein, the "second wireless communication interface" refers to a WLAN interface between the second Wi-Fi access point in the Wi-Fi access network and the base station, and for purposes of illustration, is hereafter referred to as the "second Wi-Fi interface". The second Wi-Fi interface is the immediate interface that connects the base station to the second Wi-Fi access point.

Also, as used herein, "interface selection criteria" refers to criteria used for selecting Wi-Fi interfaces in the Wi-Fi access network for offloading data packets from the long term evolution (LTE) interface. The predetermined interface selection criteria comprises, for example, a latency budget available for the data packets based on quality of service requirements of a bearer on the S1-U interface for which the selection of the Wi-Fi interfaces is required and the latency measured on the bearer for which the selection of the Wi-Fi interfaces is required, latency of a shortest path available to the user device via the Wi-Fi access network, a received signal strength indicator (RSSI), a signal-to-interference-plus-noise ratio (SINR), number of missed beacons of the Wi-Fi interfaces, data load on the Wi-Fi interfaces between the base station and the user device, power consumption of the user device in communicating on the first Wi-Fi interface, etc. The data load on the Wi-Fi interface is determined, for example, by a data rate that is being served by the Wi-Fi interface.

The wireless access interface selection and monitoring system (WAISMS) selects the first Wi-Fi interface. To reach the first Wi-Fi interface and the first Wi-Fi access point visible to the user device, the base station forwards the data packets to the second Wi-Fi access point via the second Wi-Fi interface. The WAISMS selects only the first Wi-Fi interface and the second Wi-Fi interface corresponding to the first Wi-Fi access point and the second Wi-Fi access point respectively. There are a number of intermediate Wi-Fi access points and corresponding Wi-Fi interfaces to be traversed between the two Wi-Fi access points selected by the WAISMS. While the WAISMS does not select the intermediate Wi-Fi access points directly, information on the intermediate Wi-Fi access points form a part of the network latency information and the network node information. The intermediate Wi-Fi access points and corresponding Wi-Fi interfaces to be traversed are selected by the first Wi-Fi access point and the second Wi-Fi access point selected by the WAISMS in the base station.

The wireless access interface selection and monitoring system (WAISMS) generates and transmits 106 a notification of the selected first Wi-Fi interface and the selected second Wi-Fi interface to the cellular wireless access data offload system (CWADOS) to allow the CWADOS to offload downlink data packets to the selected first Wi-Fi interface via the selected second Wi-Fi interface. As used herein, "downlink data packets" refer to the data packets moving from the core network to the user device via the base station. The data packets moving from the user device to the core network via the base station are herein referred to as "uplink data packets". The WAISMS responds with a positive acknowledgment to the request from the CWADOS with the selected first Wi-Fi interface associated with the selected first Wi-Fi access point from the list of Wi-Fi access points in the interface selection information. The positive acknowledgement further comprises the second Wi-Fi access point to which the downlink data packets must be forwarded on the second Wi-Fi interface to reach the selected first Wi-Fi access point. The intermediate Wi-Fi interfaces to reach the selected first Wi-Fi interface from the selected second Wi-Fi interface are selected by the Wi-Fi access points in the Wi-Fi access network that act as intermediate nodes by their capability to support routing functionality. For the uplink data packets, the CWADOS instructs the user device to forward the uplink data packets on the selected first Wi-Fi interface of the first Wi-Fi access point and on the second Wi-Fi interface to the base station. In an embodiment, for each bearer of each connected user device, the WAISMS decides a path through the Wi-Fi access network on which the uplink data packets should be forwarded to the core network, for example, based on the path delay being within the latency budget for that bearer and the forwarding of the uplink data packet not overloading any Wi-Fi access point in the path to the core network.

The wireless access interface selection and monitoring system (WAISMS) iteratively monitors 107 the Wi-Fi interfaces associated with the Wi-Fi access points in the Wi-Fi access network and dynamically updates the network latency information for selecting subsequent Wi-Fi interfaces in the Wi-Fi access network for offloading the downlink data packets. The WAISMS performs continuous evaluation of the predetermined interface selection criteria for selecting the Wi-Fi interface associated with the Wi-Fi access point to forward the downlink data packets whenever the WAISMS receives the interface selection information and the network node information. In an embodiment, the WAISMS generates and transmits a notification of failure of the Wi-Fi interfaces to satisfy the predetermined interface selection criteria to the cellular wireless access data offload system (CWADOS) based on the dynamically updated network latency information. That is, the WAISMS responds to the CWADOS with a negative acknowledgment for not being able to locate a suitable Wi-Fi access point and associated first Wi-Fi interface and second Wi-Fi interface.

In the method disclosed herein, the wireless access interface selection and monitoring system (WAISMS) determines availability of Wi-Fi access points and Wi-Fi interfaces to offload data and outputs the determined Wi-Fi access points and Wi-Fi interfaces to offload the data. The WAISMS selects a suitable Wi-Fi access point based on multiple inputs comprising, for example, loading of the Wi-Fi access points in the Wi-Fi access network as reported by the Wi-Fi access points periodically or on change of the Wi-Fi access points, a list of service set identifiers (SSIDs) of the Wi-Fi access points visible to the user device along with measurements on the signal quality such as the received signal strength indicator (RSSI), the signal-to-interference-plus-noise ratio (SINR), and the number of missed beacons. The other inputs comprise, for example, the quality of service requirements of a bearer to be offloaded to the Wi-Fi interfaces, latency on the S1-U interface for the bearer to be offloaded, latency towards each of the Wi-Fi access points visible to the user device, path loss in a wireless path between the Wi-Fi access points and the user device. The WAISMS processes the input data and transforms the input data into an output to be used in the interface selection criteria. The output specifies whether a suitable Wi-Fi access point and path defined by Wi-Fi interfaces are available and a selection of the Wi-Fi access point and a path to be taken towards the selected Wi-Fi access point.

On implementing the method disclosed herein to dynamically select and monitor the Wi-Fi interfaces associated with the Wi-Fi access points in the Wi-Fi access network for offloading data from the long term evolution (LTE) interface between the user device and the base station in the LTE network to the selected Wi-Fi interfaces, the end result is a tangible selection of a Wi-Fi access point and associated Wi-Fi interfaces to reach the selected Wi-Fi access point through the Wi-Fi access network. The selection of the Wi-Fi interfaces associated with the Wi-Fi access points further enables the cellular wireless access data offload system (CWADOS) to offload data to the Wi-Fi access network and thus caters to additional users or additional data traffic that may otherwise have not been possible. Furthermore, the method disclosed herein allows the offload of data to the Wi-Fi access network to happen in deployments where connections via a cable to each Wi-Fi access point and each base station may not be possible. The method disclosed herein allows data offload to happen while not compromising the quality of service delivered to the bearers to which the data packets belong. The LTE connection acts as an anchor connection, thereby assuring quality of service (QoS). If the QoS requirements of the data are not met by the Wi-Fi access network, the offloaded data is transferred back to the LTE network. For the offloaded data to be transferred back to the LTE network, there must be some other traffic flow on the LTE network that meets the QoS requirements of the Wi-Fi access network and that can be swapped to the Wi-Fi access network to manage the load on the base station in the LTE network, that is, the LTE evolved Node B (LTE eNodeB). In an embodiment, offloaded data is also transferred back to the LTE network if the traffic flow on the LTE network through the LTE eNodeB has reduced since the data was offloaded.

The method disclosed herein allows the base station to function in the absence of a cabled connection to the core network, to cater to a larger number of users, and to offer more throughput by offloading data to the Wi-Fi interface without further requiring cabled connections to the Wi-Fi access points. The concepts of a heterogeneous access network implemented using the LTE technology, Wi-Fi technology, and other technologies, and associated base stations are predefined. The method disclosed herein implements a technique of offloading data from the long term evolution (LTE) interface to the Wi-Fi interface by utilizing an ad hoc Wi-Fi access network without compromising the quality of service (QoS) requirements of the traffic flow. In an embodiment, the ad hoc Wi-Fi access network is setup using only Wi-Fi access points and LTE base stations, where only one Wi-Fi access point needs to have a connection to the core network. In this setup, a number of LTE base stations and Wi-Fi access points are installed at convenient locations such that the LTE base stations and the Wi-Fi access points can communicate over the Wi-Fi access network to the entire area and to the nearest point where a backhaul connection to the core network may be established. The wireless access interface selection and monitoring system (WAISMS) disclosed herein provides coverage to a larger area that is not accessible via cabled connections. Moreover, the QoS guarantees that are required for some of the communications in such scenarios can still be provided since the LTE connection acts as an anchor and the Wi-Fi access network is used only as an offload mechanism and as a means to reach a wired access point. Furthermore, the ability to locate the base station as close to the user devices as possible means that the base station can transmit at lower power levels, thereby resulting in power saving and reduced heating, which are required in ad hoc deployments. The WAISMS therefore improves the performance of the LTE base station.

In the method disclosed herein, by combining concepts of Wi-Fi offload and the ad hoc Wi-Fi access network, the LTE interface continues to be an anchor connection and not just another interface type in the heterogeneous access network. Furthermore, the method disclosed herein allows the data offload to be achieved over the ad hoc Wi-Fi access network while requiring minimal changes to existing elements such as Wi-Fi access points and base stations. The method disclosed herein enhances the performance of existing LTE network setups, the base station, and the Wi-Fi access points without introducing additional elements in the LTE network and with minimal changes to the existing elements in the LTE network. Therefore, the method disclosed herein provides flexibility towards offering coverage and capacity using existing technologies and equipment, for example, Wi-Fi technology, LTE technology, respective Wi-Fi access points, and base stations in embodiments where a cabled network access cannot be provided to the possible locations of the Wi-Fi access points and the base stations. Switching between offloading to a Wi-Fi access point and offloading from a Wi-Fi access point is performed based on loading of the Wi-Fi access point. By offloading only when the Wi-Fi access point is not loaded and by offloading when the base station is being loaded, the wireless access interface selection and monitoring system (WAISMS) maintains load on elements of the LTE network at manageable levels thereby avoiding congestion and a complete stalling of the LTE network that severe congestion in LTE network elements causes. By maintaining the load on the elements of the LTE network, the WAISMS allows the base stations to operate more reliably and efficiently.

The method disclosed herein allows offload to a Wi-Fi access point over an ad hoc Wi-Fi access network and allows the base station in the long term evolution (LTE) network to be connected to the core network over the same or a different ad hoc Wi-Fi access network, thereby allowing flexible locations for the base stations and the Wi-Fi access points and reliable wireless coverage even in locations where it is not possible to have wired connections to all the base stations and Wi-Fi access points. Furthermore, power consumption in the user device may be reduced by placing base stations and Wi-Fi access points at locations as close as possible to the user device even if there is no wired connectivity to those locations. The method disclosed herein further ensures that quality of service (QoS) requirements are met and that mobility of the user device is supported even when the offload happens over the Wi-Fi access network.

Figure 2:
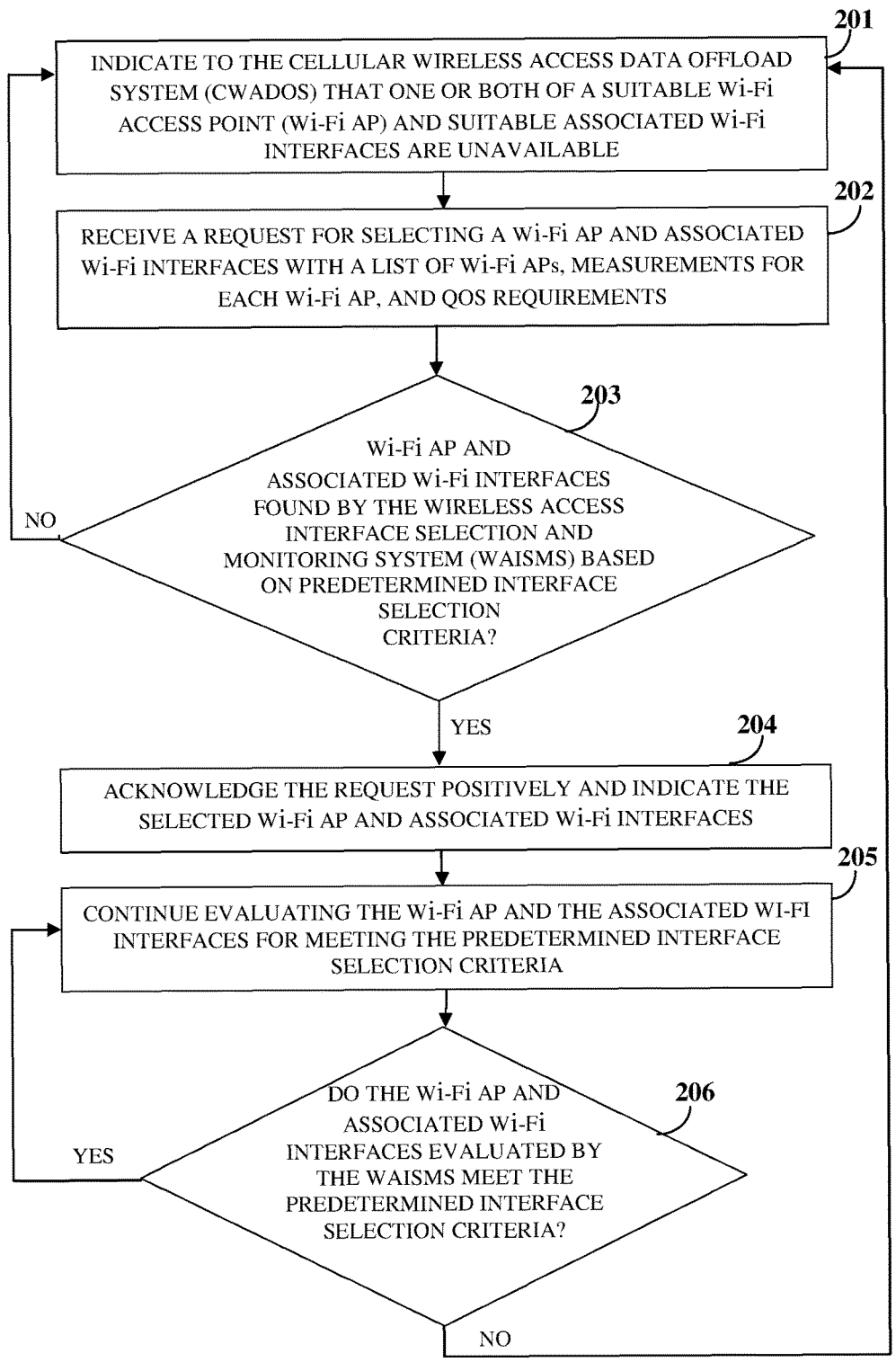
FIG. 2 exemplarily illustrates a flowchart comprising steps performed by a wireless access interface selection and monitoring system for dynamically selecting and monitoring wireless access points and associated wireless communication interfaces in a wireless access network for offloading data from a cellular wireless communication interface between a user device and a base station in a cellular wireless communication network to the selected wireless communication interfaces.

FIG. 2 exemplarily illustrates a flowchart comprising steps performed by the wireless access interface selection and monitoring system (WAISMS) for dynamically selecting and monitoring wireless access points and associated wireless communication interfaces in a wireless access network for offloading data from a cellular wireless communication interface between a user device and a base station in a cellular wireless communication network to the selected wireless communication interfaces. The wireless access point, the wireless communication interfaces, the wireless access network, the cellular wireless communication interface, and the cellular wireless communication network are hereafter referred to as the "Wi-Fi access point (Wi-Fi AP)", the "Wi-Fi interfaces", the "Wi-Fi access network", the "long term evolution (LTE) interface", and the "LTE network" respectively. The WAISMS indicates 201 to the cellular wireless access data offload system (CWADOS) that a suitable Wi-Fi access point and/or suitable associated Wi-Fi interfaces are unavailable to offload data packets. The suitable Wi-Fi AP and/or suitable associated Wi-Fi interfaces are the Wi-Fi AP and associated Wi-Fi interfaces that satisfy the predetermined interface selection criteria disclosed in the detailed description of FIG. 1.

The wireless access interface selection and monitoring system (WAISMS) receives 202 a request from the cellular wireless access data offload system (CWADOS) for selecting a Wi-Fi access point (Wi-Fi AP) and associated Wi-Fi interfaces with a list of Wi-Fi APs, measurements for each Wi-Fi AP, and quality of service (QoS) requirements of a bearer for which selection of the Wi-Fi interfaces is required. The WAISMS selects a Wi-Fi AP and associated Wi-Fi interfaces, and determines 203 whether the selected Wi-Fi AP and the associated Wi-Fi interfaces satisfy the predetermined interface selection criteria. If the selected Wi-Fi AP and associated Wi-Fi interfaces do not satisfy the predetermined interface selection criteria, the WAISMS indicates 201 to the CWADOS that a suitable Wi-Fi AP and suitable associated Wi-Fi interfaces are not available. If the selected Wi-Fi AP and the associated Wi-Fi interfaces satisfy the predetermined interface selection criteria, the WAISMS acknowledges 204 the request of the CWADOS positively and indicates the selected Wi-Fi AP and the associated Wi-Fi interfaces. The WAISMS continues 205 evaluating the Wi-Fi AP and the associated Wi-Fi interfaces for meeting the predetermined interface selection criteria. The WAISMS determines 206 whether the evaluated Wi-Fi AP and associated Wi-Fi interfaces satisfy the predetermined interface selection criteria. If the evaluated Wi-Fi AP and associated Wi-Fi interfaces satisfy the predetermined interface selection criteria, the WAISMS continues 205 evaluating the Wi-Fi APs and the associated Wi-Fi interfaces for meeting the predetermined interface selection criteria. If the evaluated Wi-Fi AP and the associated Wi-Fi interfaces do not satisfy the predetermined interface selection criteria, the WAISMS indicates 201 to the CWADOS that no suitable Wi-Fi AP and associated Wi-Fi interfaces are found.

Figure 3A:
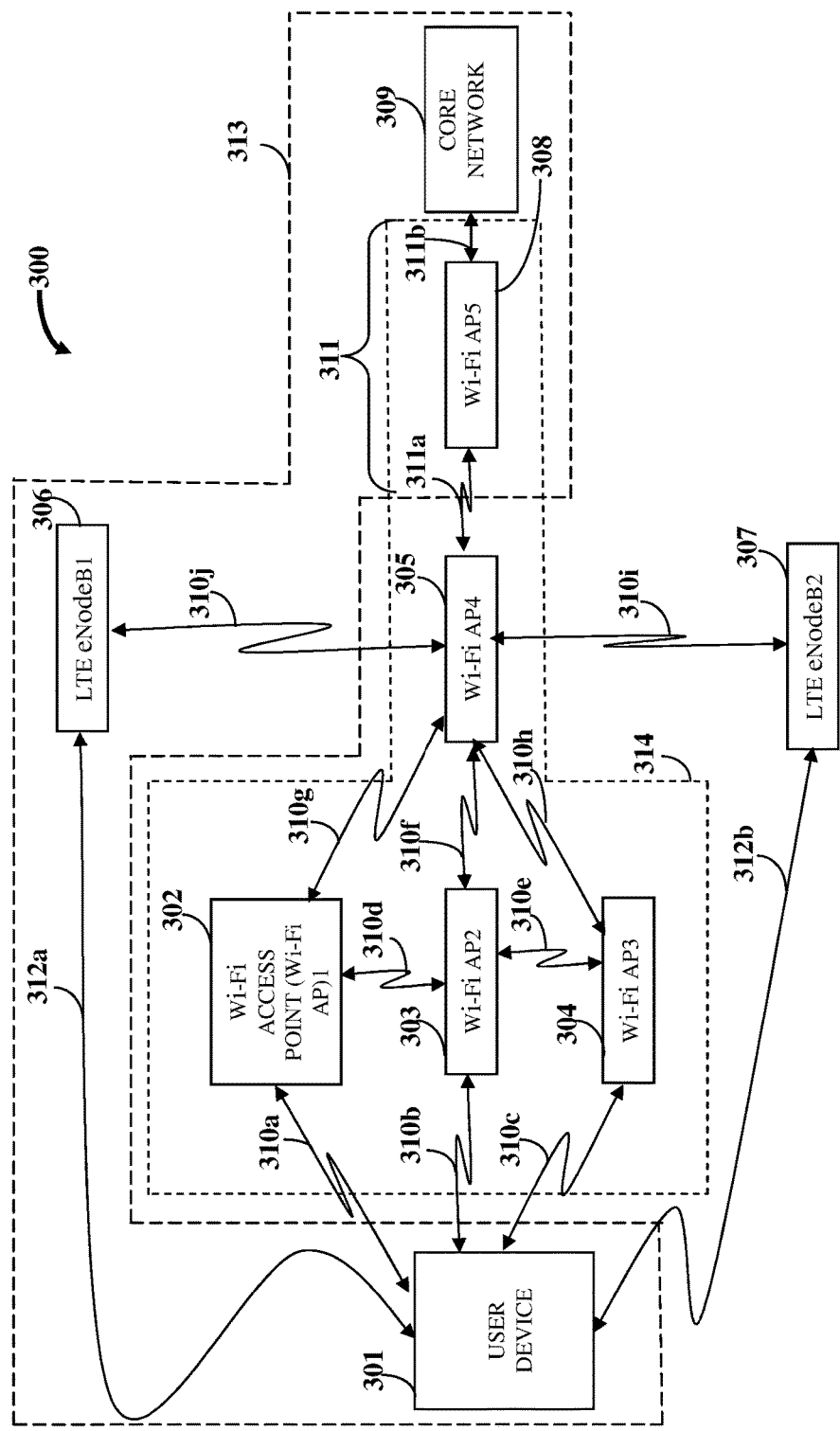
FIG. 3A exemplarily illustrates a long term evolution and Wi-Fi access network based communication system, showing multiple Wi-Fi access points in a Wi-Fi access network.

FIG. 3A exemplarily illustrates a long term evolution (LTE) and Wi-Fi access network based communication system 300, showing multiple Wi-Fi access points (Wi-Fi APs) 302, 303, 304, 305, and 308 in a Wi-Fi access network 314. As exemplarily illustrated in FIG. 3A, the LTE and Wi-Fi access network based communication system 300 disclosed herein comprises a user device 301, Wi-Fi APs 302, 303, 304, 305, and 308 of the Wi-Fi access network 314 with connecting Wi-Fi interfaces 310a, 310b, 310c, 310d, 310e, 310f, 310g, 310h, 310i, 310j, and 311a, and an LTE network 313 comprising base stations represented as LTE evolved node B (LTE eNodeB)1 306 and LTE eNodeB2 307, LTE interfaces 312a and 312b between the user device 301 and the LTE eNodeBs 306 and 307, a core network 309, and a wired interface 311b. The Wi-Fi APs 302, 303, 304, 305, and 308 of the Wi-Fi access network 314 are arranged in a mesh topology to form a wireless mesh network as exemplarily illustrated in FIG. 3A. The LTE eNodeBs 306 and 307 communicate with the user device 301 via the Wi-Fi access network 314. The Wi-Fi APs 302, 303, 304, 305, and 308 act as nodes of the Wi-Fi access network 314 and are connected to each other via the Wi-Fi interfaces 310a, 310b, 310c, 310d, 310e, 310f, 310g, 310h, 310i, 310j, and 311a as exemplarily illustrated in FIG. 3A. The communications on the Wi-Fi interfaces 310a, 310b, 310c, 310d, 310e, 310f, 310g, 310h, 310i, 310j, and 311a are bidirectional. Different network topologies, for example, a fully connected mesh topology, a partially connected mesh topology, a daisy chain topology, a star topology, etc., are obtained by organizing the Wi-Fi APs 302, 303, 304, 305, and 308 of the Wi-Fi access network 314 in different configurations.

As exemplarily illustrated in FIG. 3A, in the long term evolution (LTE) network 313, the user device 301 is connected to the LTE eNodeB1 306 over the LTE interface 312a and to the LTE eNodeB2 307 over the LTE interface 312b. The user device 301 is connected to one of the Wi-Fi access points (Wi-Fi APs) 302, 303, or 304 over one of the Wi-Fi interfaces 310a, 310b, or 310c respectively. The Wi-Fi interfaces 310a, 310b, and 310c are visible to the user device 301. The Wi-Fi AP1 302 is connected to the Wi-Fi AP2 303 via the Wi-Fi interface 310d and to the Wi-Fi AP4 305 via the Wi-Fi interface 310g. The Wi-Fi AP2 303 is connected to the Wi-Fi AP3 304 and the Wi-Fi AP4 305 over the Wi-Fi interfaces 310e and 310f respectively. The Wi-Fi AP3 304 is connected to the Wi-Fi AP4 305 over the Wi-Fi interface 310h. The Wi-Fi AP4 305 communicates with the LTE eNodeB1 306 via the Wi-Fi interface 310j and with the LTE eNodeB2 307 via the Wi-Fi interface 310i. The Wi-Fi AP4 305 communicates with the Wi-Fi AP5 308 via the Wi-Fi interface 311a. The Wi-Fi AP5 308 communicates with the core network 309 of the LTE network 313 via a wired interface 311b. The wired interface 311b and the Wi-Fi interface 311a constitute a backhaul connection to the core network 309 of the LTE network 313 from the LTE eNodeB1 306 and the LTE eNodeB2 307. This backhaul connection is used for the user plane of the S1 interface, that is, the S1-U interface 311. In an embodiment, the Wi-Fi interfaces 310j and 311a, and the wired interface 311b form the backhaul connection to the core network 309 from the LTE eNodeB1 306, while the Wi-Fi interfaces 310i and 311a, and the wired interface 311b form the backhaul connection to the core network 309 from the LTE eNodeB2 307.

As exemplarily illustrated in FIG. 3A, the Wi-Fi access point (Wi-Fi AP)4 305 can communicate with the long term evolution (LTE) eNodeB1 306 and the LTE eNodeB2 307 over the Wi-Fi interfaces 310j and 310i respectively. The LTE eNodeB1 306 can communicate with the Wi-Fi AP1 302 over multiple paths. For example, the LTE eNodeB1 306 can communicate with the Wi-Fi AP1 302 via the Wi-Fi AP4 305 and the Wi-Fi AP2 303 over the Wi-Fi interfaces 310j, 310f, and 310d, or via the Wi-Fi AP4 305 alone over the Wi-Fi interfaces 310j and 310g. The LTE eNodeB1 306 can communicate with the Wi-Fi AP2 303 through multiple paths to route data packets. For example, the LTE eNodeB1 306 can communicate with the Wi-Fi AP2 303 via the Wi-Fi AP4 305 and the Wi-Fi AP1 302 over the Wi-Fi interfaces 310j, 310g, and 310d, via the Wi-Fi AP4 305 alone over the Wi-Fi interfaces 310j and 310f, or via the Wi-Fi AP4 305 and the Wi-Fi AP3 304 over the Wi-Fi interfaces 310j, 310h, and 310e. The LTE eNodeB1 306 can communicate with the Wi-Fi AP3 304, for example, via the Wi-Fi AP4 305 and the Wi-Fi AP2 303 over the Wi-Fi interfaces 310j, 310f, and 310e, or via the Wi-Fi AP4 305 alone over the Wi-Fi interfaces 310j and 310h. The Wi-Fi AP4 305, the Wi-Fi AP3 304, the Wi-Fi AP2 303, and the Wi-Fi AP1 302 configured in a mesh topology have a routing functionality to reach the Wi-Fi interface 310a from the Wi-Fi interface 310j via the Wi-Fi interfaces 310d, 310e, 310f, 310g, and 310h.

Similarly, the paths for the long term evolution (LTE) eNodeB2 307 to communicate with the Wi-Fi access point (Wi-Fi AP)1 302 comprise, for example, communicating via the Wi-Fi AP4 305 and the Wi-Fi AP2 303 over the Wi-Fi interfaces 310i, 310f, and 310d and communicating via the Wi-Fi AP4 305 alone over the Wi-Fi interfaces 310i and 310g. The paths for the LTE eNodeB2 307 to communicate with the Wi-Fi AP2 303 comprise, for example, communicating via the Wi-Fi AP4 305 and the Wi-Fi AP1 302 over the Wi-Fi interfaces 310i, 310g, and 310d, communicating via the Wi-Fi AP4 305 alone over the Wi-Fi interfaces 310i and 310f, and communicating via the Wi-Fi AP4 305 and the Wi-Fi AP3 304 over the Wi-Fi interfaces 310i, 310h, and 310e. The paths for the LTE eNodeB2 307 to communicate with the Wi-Fi AP3 304 comprise, for example, communicating via the Wi-Fi AP4 305 and the Wi-Fi AP2 303 over the Wi-Fi interfaces 310i, 310f, and 310e and communicating via the Wi-Fi AP4 305 alone over the Wi-Fi interfaces 310i and 310h.

The long term evolution (LTE) eNodeB1 306 communicates with the core network 309 of the LTE network 313 over the Wi-Fi interfaces 310j and 311a and the wired interface 311b via the Wi-Fi access point (Wi-Fi AP)4 305 and the Wi-Fi AP5 308. Similarly, the LTE eNodeB2 307 communicates with the core network 309 of the LTE network 313 over the Wi-Fi interfaces 310i and 311a and the wired interface 311b via the Wi-Fi AP4 305 and the Wi-Fi AP5 308. For purposes of illustration, the wireless access interface selection and monitoring system (WAISMS) disclosed herein is located in the LTE eNodeB1 306 along with the cellular wireless access data offload system (CWADOS). The CWADOS offloads data to the Wi-Fi access network 314. From a perspective of the LTE eNodeB1 306, the data offloading refers to forwarding the data packets away from the LTE interface 312a via the Wi-Fi access network 314. Within the Wi-Fi access network 314, the data packets may take a number of paths to the user device 301. In an example, the CWADOS offloads data from the LTE interface 312a between the user device 301 and the LTE eNodeB1 306, for example, to the Wi-Fi interfaces 310j, 310g, and 310a. From the perspective of the user device 301, the data is offloaded from the LTE interface 312a to one of the Wi-Fi interfaces 310a, 310b, and 310c via one or more of the Wi-Fi interfaces 310d, 310e, 310f, 310g, 310h, and 310j in the Wi-Fi access network 314. The WAISMS selects a suitable Wi-Fi AP 302, 303, or 304, a suitable associated Wi-Fi interface 310a, 310b, or 310c, a suitable Wi-Fi AP 305, and a corresponding Wi-Fi interface 310j, for forwarding the downlink data packets to the user device 301 based on the predetermined interface selection criteria and the interface selection information disclosed in the detailed description of FIG. 1. The Wi-Fi APs 302, 303, 304, 305, and 308 are positioned at a location away from the LTE eNodeB 306 or 307.

Figure 3B:
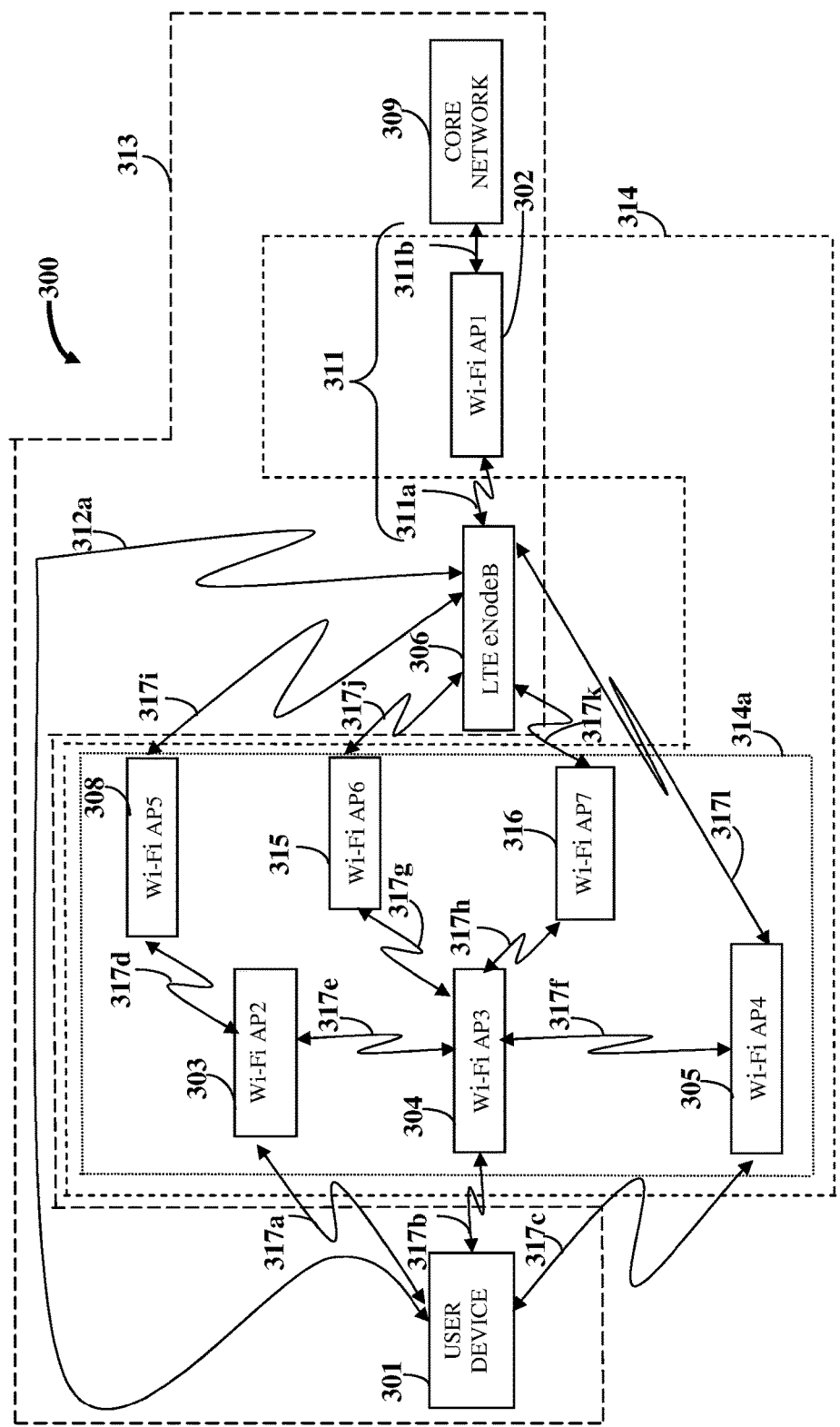
FIG. 3B exemplarily illustrates an embodiment of the long term evolution and Wi-Fi access network based communication system, showing multiple Wi-Fi access points in a Wi-Fi access network.

FIG. 3B exemplarily illustrates an embodiment of the long term evolution (LTE) and Wi-Fi access network based communication system 300, showing multiple Wi-Fi access points (Wi-Fi APs) 302, 303, 304, 305, 308, 315, and 316 in a Wi-Fi access network 314. Consider an example that illustrates the method for dynamically selecting and monitoring Wi-Fi interfaces 317a, 317b, 317c, 317i, 317j, 317k, and 317l associated with Wi-Fi APs 303, 304, 305, 308, 315, and 316 in the Wi-Fi access network 314 for offloading data from the LTE interface 312a between a user device 301 and a base station, hereafter referred to as an "LTE evolved node B (LTE eNodeB)" in an LTE network 313 to the selected Wi-Fi interfaces 317a, 317b, 317c, 317i, 317j, 317k, and 317l. Implementation of an ad hoc Wi-Fi mesh network 314a in a natural disaster zone, for example, an area affected by floods is illustrated in this example. The Wi-Fi APs 303, 304, 305, 308, 315, and 316 in the Wi-Fi access network 314 are arranged in a mesh topology to form the Wi-Fi mesh network 314a. The Wi-Fi AP1 302 also forms a part of the Wi-Fi access network 314.

As exemplarily illustrated in FIG. 3B, the core network 309 is accessible to the long term evolution evolved node B (LTE eNodeB) 306 via a Wi-Fi access point (Wi-Fi AP) Wi-Fi AP1 302, a Wi-Fi interface 311a, and a wired interface 311b. The Wi-Fi interface 311a and the wired interface 311b together form the S1-U interface 311. The user device 301 has a packet data network (PDN) connection via the LTE eNodeB 306. The Wi-Fi APs Wi-Fi AP2 303, Wi-Fi AP3 304, and Wi-Fi AP4 305, and associated Wi-Fi interfaces 317a, 317b, and 317c are visible to the user device 301. The Wi-Fi AP2 303 is accessible to the LTE eNodeB 306 via the Wi-Fi AP5 308 and the Wi-Fi interfaces 317d and 317i. The Wi-Fi AP3 304 is accessible to the LTE eNodeB 306 via the Wi-Fi APs Wi-Fi AP6 315 and Wi-Fi AP7 316 and associated Wi-Fi interfaces 317g, 317j, 317h, and 317k. The Wi-Fi AP4 305 is directly accessible to the LTE eNodeB 306 via the Wi-Fi interface 317l. The cellular wireless access data offload system (CWADOS) on the LTE eNodeB 306 decides to offload data for a specific bearer on the LTE interface 312a to the Wi-Fi mesh network 314a since the LTE interface 312a is overloaded.

The cellular wireless access data offload system (CWADOS) queries the wireless access interface selection and monitoring system (WAISMS) implemented in the long term evolution evolved node B (LTE eNodeB) 306 for a Wi-Fi access point (Wi-Fi AP) and a path with the interface selection information comprising, for example, a list of the Wi-Fi APs 303, 304, and 305 with service set identifiers (SSIDs), a received signal strength indicator (RSSI) of each of the listed Wi-Fi APs 303, 304, and 305, a signal-to-interference-plus-noise ratio (SINR) of each of the listed Wi-Fi APs 303, 304, and 305, and the number of missed beacons of each of the listed Wi-Fi APs 303, 304, and 305. The path is selected from among the Wi-Fi interfaces 317a, 317b, 317c, 317d, 317e, 317f, 317g, 317h, 317i, 317j, 317k, and 317l of the Wi-Fi mesh network 314a that allows communication between the user device 301 and the core network 309. The quality of service (QoS) requirements of data packets is also included in the interface selection information. The QoS requirements comprise, for example, a guaranteed bit rate for the data packets, a maximum bit rate for the data packets, a priority of the data packets, and a latency budget available to the data packets. The interface selection information of the Wi-Fi AP2 303 is, for example, Wi-Fi AP2, −75 decibels-milliwatts (dBm), 10 decibels (dB), and 10 corresponding to the SSID, the RSSI, the SINR, and the number of missed beacons respectively. Similarly, for the Wi-Fi AP3 304, the interface selection information is, for example, Wi-Fi AP3, −62 dBm, 18 dB, and 5 corresponding to the SSID, the RSSI, the SINR, and the number of missed beacons respectively. For the Wi-Fi AP4 305, the interface selection information is, for example, Wi-Fi AP4, −76 dBm, 9 dB, and 12 corresponding to the SSID, the RSSI, the SINR, and the number of missed beacons respectively. The QoS requirements of the data packets are, for example, 1 megabits per second (Mbps), 2 Mbps, 5, and 300 milliseconds (ms) for the guaranteed bit rate for transmission of the data packets, the maximum bit rate for transmission of the data packets, the priority of the data packets, and the latency budget available to the data packets, respectively.

The wireless access interface selection and monitoring system (WAISMS) measures the latency for the specific bearer on the S1-U interface 311 by performing an internet control message protocol (ICMP) echo procedure with the core network 309 through the Wi-Fi access point (Wi-Fi AP)1 302. The S1-U interface 311 is between the long term evolution (LTE) eNodeB 306 and the core network 309 and a data packet takes two hops, that is, one hop from the LTE eNodeB 306 to the Wi-Fi AP1 302 over the Wi-Fi interface 311*a* and another hop from the Wi-Fi AP1 302 to the core network 309 over the wired interface 311*b*. The WAISMS measures the latency over the S1-U interface 311, for example, as 200 ms. The WAISMS measures the latency for the Wi-Fi AP2 303, the Wi-Fi AP3 304, and the Wi-Fi AP4 305 over the Wi-Fi interfaces 317*i*, 317*j*, 317*k*, and 317*l* by performing the ICMP echo procedure with each of the Wi-Fi APs 303, 304, and 305, for example, as 100 ms, 200 ms, and 20 ms respectively. The WAISMS also receives the network node information pertaining to data rates supported by the Wi-Fi AP2 303, the Wi-Fi AP3 304, and the Wi-Fi AP4 305, for example, as 5 Mbps, 10 Mbps, and 1 Mbps respectively.

The wireless access interface selection and monitoring system (WAISMS) determines that from the latency budget of 300 ms available to the data packets, transmitting the data packets on the S1-U interface 311 between the LTE eNodeB 306 and the core network 309 consumes 200 ms. Therefore, only 100 ms of the latency budget is available to the data packets to route the data packets to the user device 301 from the LTE eNodeB 306. Since the latencies measured for the data packets to reach the Wi-Fi AP2 303 over the Wi-Fi interface 317*i* and to the Wi-Fi AP3 304 over the Wi-Fi interfaces 317*j* and 317*k* from the LTE eNodeB 306 is 100 ms or greater, the WAISMS excludes the Wi-Fi interfaces 317*i*, 317*j*, and 317*k* and the associated Wi-Fi APs Wi-Fi AP2 303 and Wi-Fi AP3 304 from routing the data packets to the user device 301. Because the Wi-Fi AP Wi-Fi AP4 305 and the associated Wi-Fi interface 317*l* add a latency of 20 ms, which is below the available budget of 100 ms, and that Wi-Fi AP4 305 supports the guaranteed bit rate of 1 Mbps and since the priority is lower, that is, 5, the WAISMS determines that the maximum bit rate need not be offered. Therefore, the WAISMS selects the Wi-Fi AP4 305 and the associated Wi-Fi interface 317*l* to offload data and as the next hop, since the Wi-Fi AP4 305 is directly accessible to the LTE eNodeB 306, and sends a notification in a positive acknowledgement to the request from the cellular wireless access data offload system (CWADOS). The WAISMS therefore selects a first Wi-Fi interface, namely, the Wi-Fi interface 317*c* between the user device 301 and the Wi-Fi AP Wi-Fi AP4 305 in the Wi-Fi mesh network 314*a*, and the second Wi-Fi interface 317*l* between the Wi-Fi AP4 305 and the long term evolution (LTE) eNodeB 306. The path selected for offloading data by the CWADOS is via the Wi-Fi AP4 305 over the Wi-Fi interfaces 317*l* and 317*c*.

The illustrated example allows for streaming of a video of 1 Mbps to the user device 301, where the video contains, for example, visual instructions on how to offer first aid or safely evacuate people impacted by the natural disaster, whereas otherwise streaming of the video may have not been possible due to network congestion at the time of the natural disaster. In such conditions, the cables or the existing long term evolution (LTE) network 313 may also not be functional. Power may also not be available to the LTE network 313. Deploying the Wi-Fi mesh network 314*a* allows battery operated Wi-Fi access points (Wi-Fi-APs) 303, 304, 305, 308, 315, and 316 and the LTE eNodeB 306 to be deployed and to reach the core network 309 from the nearest point where wired connections are available. Such an ad hoc Wi-Fi mesh network 314*a* may be setup quickly by utilizing the available mount points for the LTE eNodeBs 306 and the Wi-Fi APs 303, 304, 305, 308, 315, and 316.

Consider another example that illustrates the method for dynamically selecting and monitoring Wi-Fi interfaces, 317*a*, 317*b*, 317*c*, 317*i*, 317*j*, 317*k*, and 317*l* associated with the Wi-Fi access points (Wi-Fi APs) 303, 304, 305, 308, 315, and 316 in the Wi-Fi mesh network 314*a* exemplarily illustrated in FIG. 3B, for offloading data from the long term evolution (LTE) interface 312*a* of the LTE eNodeB 306 in the LTE network 313 to the selected Wi-Fi interfaces 317*a*, 317*b*, 317*c*, 317*i*, 317*j*, 317*k*, and 317*l* in the Wi-Fi mesh network 314*a*. This example illustrates the offloading of data pertaining to underground maintenance personnel from the LTE interface 312*a* to the Wi-Fi mesh network 314*a* in an underground wireless telemetry solution that relays health information of the underground maintenance personnel to a centralized control room. As exemplarily illustrated in FIG. 3B, the core network 309 is accessible to the LTE eNodeB 306 via the Wi-Fi AP1 302, the Wi-Fi interface 311*a*, and the wired interface 311*b*. The Wi-Fi interface 311*a* and the wired interface 311*b* together form the S1-U interface 311. The user device 301 has a packet data network (PDN) connection via the LTE eNodeB 306. The Wi-Fi APs Wi-Fi AP2 303, Wi-Fi AP3 304, and Wi-Fi AP4 305 and associated Wi-Fi interfaces 317*a*, 317*b*, and 317*c* are visible to the user device 301. The Wi-Fi AP2 303 is accessible to the LTE eNodeB 306 via the Wi-Fi AP5 308 and the Wi-Fi interfaces 317*d* and 317*i*. The Wi-Fi AP3 304 is accessible to the LTE eNodeB 306 via the Wi-Fi AP6 315 and the Wi-Fi AP7 316 and associated Wi-Fi interfaces 317*g*, 317*j*, 317*h*, and 317*k*. The Wi-Fi AP4 305 is directly accessible to the LTE eNodeB 306 via the Wi-Fi interface 317*l*. The cellular wireless access data offload system (CWADOS) on the LTE eNodeB 306 decides to offload the data for a specific bearer on the LTE interface 312*a* to the Wi-Fi mesh network 314*a* since the LTE interface 312*a* is overloaded.

The cellular wireless access data offload system (CWADOS) queries the wireless access interface selection and monitoring system (WAISMS) implemented in the long term evolution evolved node B (LTE eNodeB) 306 for a Wi-Fi access point (Wi-Fi AP) and a path with the interface selection information. The interface selection information of the Wi-Fi AP2 303 is, for example, Wi-Fi AP2, −55 dBm, 25 dB, and 0 corresponding to the service set identifier (SSID), the received signal strength indicator (RSSI), the signal-to-interference-plus-noise ratio (SINR), and the number of missed beacons respectively. Similarly, for the Wi-Fi AP3 304, the interface selection information is, for example, Wi-Fi AP3, −62 dBm, 18 dB, and 5 corresponding to the SSID, the RSSI, the SINR, and the number of missed beacons respectively. For the Wi-Fi AP4 305, the interface selection information is, for example, Wi-Fi AP4, −61 dBm, 9 dB, and 12 corresponding to the SSID, the RSSI, the SINR, and the number of missed beacons respectively. The quality of service (QoS) requirements of the data packets are, for example, 64 kilobits per second (kbps), 64 kbps, 1, and 100 ms for the guaranteed bit rate for transmission of the data packets, a maximum bit rate for transmission of the data packets, the priority of the data packets, and the latency budget available to the data packets, respectively.

The wireless access interface selection and monitoring system (WAISMS) measures the latency for the specific bearer on the S1-U interface 311 by performing an internet control message protocol (ICMP) echo procedure with the core network 309 through the Wi-Fi access point (Wi-Fi AP) Wi-Fi AP1 302. The WAISMS measures the latency over the S1-U interface 311, for example, as 20 ms. The WAISMS measures the latency for the listed APs, the Wi-Fi AP2 303, the Wi-Fi AP3 304, and the Wi-Fi AP4 305 over the Wi-Fi interfaces 317*i*, 317*j*, 317*k*, and 317*l* by performing an ICMP echo procedure with each of the Wi-Fi APs 303, 304, and 305, for example, as 30 ms, 25 ms, and 15 ms respectively. The WAISMS also receives network node information pertaining to data rates supported by the Wi-Fi APs, that is, the Wi-Fi AP2 303 and the Wi-Fi AP3 304, for example, as 1 Mbps and 1 Mbps respectively. The Wi-Fi AP Wi-Fi AP4 305 is overloaded and cannot support any data. From the latency budget of 100 ms available to the data packets, the WAISMS determines that transmitting data packets on the S1-U interface 311 between the long term evolution (LTE) eNodeB 306 and the core network 309 consumes, for example, 20 ms. Therefore, only 80 ms of the latency budget is available to the data packets to route the data packets to the user device 301 from the LTE eNodeB 306. Since the latencies measured for the data packets to reach the Wi-Fi APs, Wi-Fi AP2 303 over the Wi-Fi interface 317$i$ and the Wi-Fi AP3 304 over the Wi-Fi interfaces 317$j$ and 317$k$ from the LTE eNodeB 306 is less than 80 ms, latency does not influence the decision of the WAISMS.

The wireless access interface selection and monitoring system (WAISMS) includes the Wi-Fi APs, that is, the Wi-Fi AP2 303 and the Wi-Fi AP3 304 in the determined Wi-Fi AP list along with associated Wi-Fi interfaces 317$i$, 317$j$, and 317$k$, and excludes the Wi-Fi AP4 305 from the list since the Wi-Fi AP4 305 does not support any more data. The WAISMS evaluates the Wi-Fi APs, that is, the Wi-Fi AP2 303 and the Wi-Fi AP3 304, and the associated Wi-Fi interfaces 317$i$, 317$j$, and 317$k$ based on interface selection criteria comprising the received signal strength indicator (RSSI), the signal-to-interference-plus-noise ratio (SINR), and the power consumption of the user device 301. Between the Wi-Fi APs, that is, the Wi-Fi AP2 303 and the Wi-Fi AP3 304 and the associated Wi-Fi interfaces 317$i$, 317$j$, and 317$k$, the WAISMS selects the Wi-Fi AP2 303 over the Wi-Fi AP3 304 and the Wi-Fi interface 317$i$ over the Wi-Fi interfaces 317$j$ and 317$k$ even though the Wi-Fi AP2 303 has a slightly higher latency compared to the latency of the Wi-Fi AP3 304. Signal quality of the Wi-Fi AP2 303 is high as indicated by the high values of the RSSI and the SINR and the absence of missed beacons. The WAISMS also measures that the RSSI is substantially close to the actual transmitted power and therefore estimates that there is low loss on the Wi-Fi interface 317$a$ between the Wi-Fi AP2 303 and the user device 301. This allows the user device 301 to consume power less than the power consumed for communication via the Wi-Fi AP3 304, which may be significant for the underground personnel to conserve a battery on a health monitoring device.

The wireless access interface selection and monitoring system (WAISMS) positively acknowledges the request from the cellular wireless access data offload system (CWADOS), indicates the Wi-Fi access point (Wi-Fi AP)2 303 to be the Wi-Fi AP selected for data offload, and indicates that the path to reach the Wi-Fi AP2 303 is via the Wi-Fi AP5 308, that is, the next hop is via the Wi-Fi AP5 308 over the Wi-Fi interface 317$i$. The WAISMS therefore selects the first Wi-Fi interface, namely, the Wi-Fi interface 317$a$ between the user device 301 and the Wi-Fi AP Wi-Fi AP2 303 in the Wi-Fi mesh network 314$a$, and the second Wi-Fi interface, for example, 317$i$ between the Wi-Fi AP5 308 and the long term evolution (LTE) eNodeB 306. The Wi-Fi AP5 308 supports routing functionality and selects the route to forward the data packets based on the load on the associated Wi-Fi interface 317$d$. The Wi-Fi AP5 308 selects the associated Wi-Fi interface 317$d$ to offload data and thus the path selected for offloading data by the CWADOS is via the Wi-Fi AP5 308 and the Wi-Fi AP2 303 over the Wi-Fi interfaces 317$i$, 317$d$, and 317$a$. The selected path defined by the Wi-Fi interfaces 317$i$, 317$d$, and 317$a$ allows the health of underground maintenance personnel to be monitored continuously even if it is not possible to have wired access to the underground locations. Such a Wi-Fi access network 314 allows deployment of lesser LTE eNodeBs and lightweight and low power Wi-Fi APs underground.

Figure 3C:
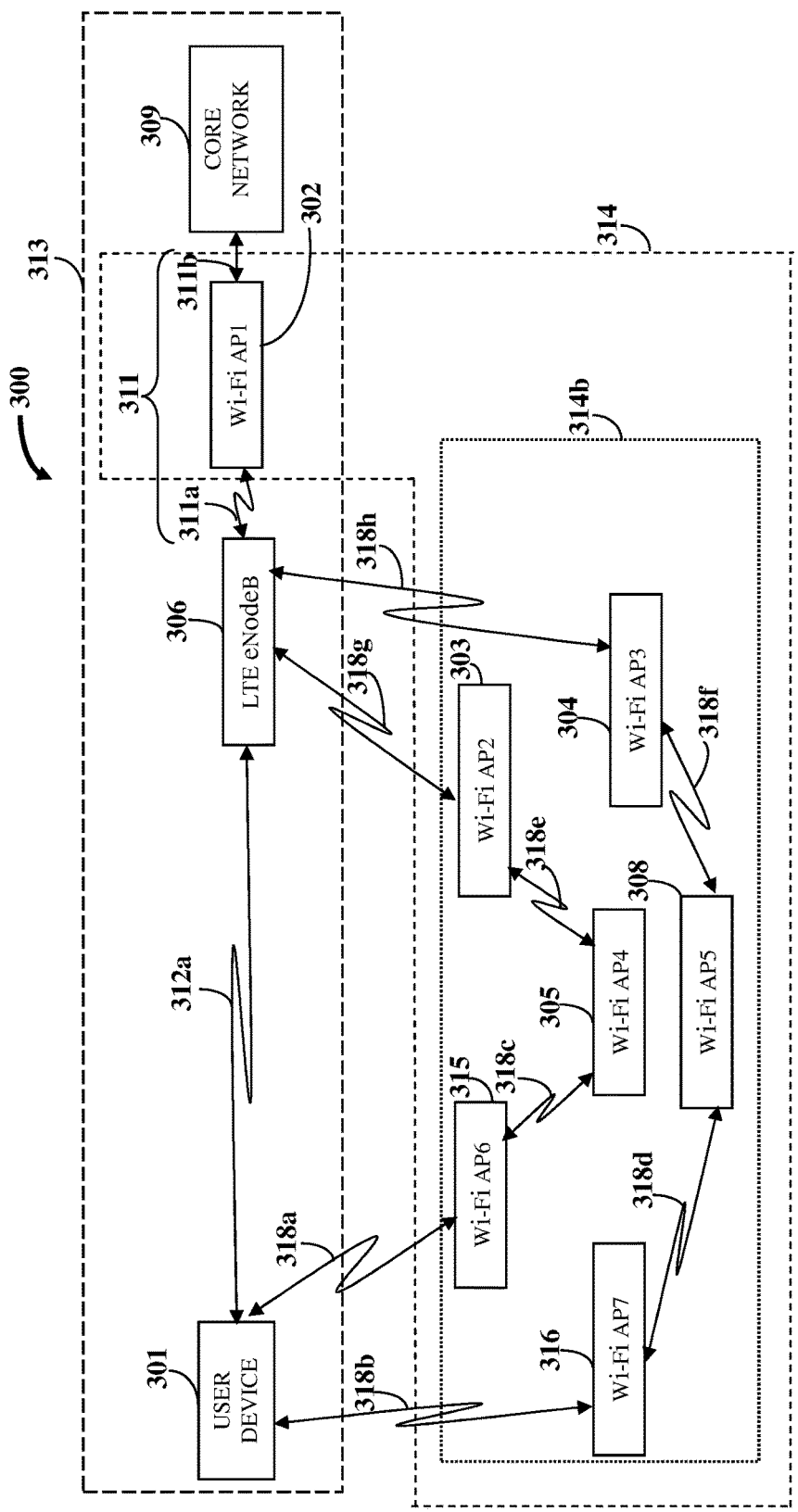
FIG. 3C exemplarily illustrates another embodiment of the long term evolution and Wi-Fi access network based communication system, showing multiple Wi-Fi access points in a Wi-Fi access network.

FIG. 3C exemplarily illustrates another embodiment of the long term evolution (LTE) and Wi-Fi access network based communication system 300, showing multiple Wi-Fi access points 302, 303, 304, 305, 308, 315, and 316 in a Wi-Fi access network 314. Consider an example that illustrates the method for dynamically selecting and monitoring Wi-Fi interfaces 318$a$, 318$b$, 318$g$, and 318$h$ associated with Wi-Fi access points (Wi-Fi APs) 315, 316, 303, and 304 in the Wi-Fi access network 314 for offloading data from a long term evolution (LTE) interface 312$a$ of the LTE eNodeB 306 in an LTE network 313 to the selected Wi-Fi interfaces 318$a$ and 318$b$ in the Wi-Fi access network 314. The Wi-Fi APs 315, 316, 303, and 304 in the Wi-Fi access network 314 form a daisy chain network 314$b$. The Wi-Fi AP1 302 is also part of the Wi-Fi access network 314. This example illustrates the offloading of data pertaining to a public venue, for example, a stadium from the LTE interface 312$a$ to the Wi-Fi daisy chain network 314$b$ in a situation where an event in happening in the stadium and a reliable data network connection has to be provided in an executive tier. As exemplarily illustrated in FIG. 3C, the core network 309 is accessible to the LTE eNodeB 306 via the Wi-Fi AP1 302, a Wi-Fi interface 311$a$, and a wired interface 311$b$. The Wi-Fi interface 311$a$ and the wired interface 311$b$ together form the S1-U interface 311. The user device 301 has a packet data network (PDN) connection via the LTE eNodeB 306. The Wi-Fi APs, that is, the Wi-Fi AP6 315 and the Wi-Fi AP7 316, and associated Wi-Fi interfaces 318$a$ and 318$b$ respectively are visible to the user device 301. The Wi-Fi AP6 315 is accessible to the LTE eNodeB 306 via the Wi-Fi AP2 303 and the Wi-Fi AP4 305 via the Wi-Fi interfaces 318$g$, 318$e$, and 318$c$. The Wi-Fi AP7 316 is accessible to the LTE eNodeB 306 via the Wi-Fi AP3 304 and the Wi-Fi AP5 308 and associated Wi-Fi interfaces 318$h$, 318$f$, and 318$d$. The cellular wireless access data offload system (CWADOS) on the LTE eNodeB 306 decides to offload the data for a specific bearer on the LTE interface 312$a$ to the Wi-Fi daisy network 314$b$ since the LTE interface 312$a$ is overloaded. The Wi-Fi AP6 315 is located to offer wireless coverage to one part of the executive tier and the Wi-Fi AP3 304 is located to offer wireless coverage to another part of the executive tier. The LTE eNodeB 306 is located at a distance from the executive cover and offers wireless coverage to multiple tiers.

The cellular wireless access data offload system (CWADOS) queries the wireless access interface selection and monitoring system (WAISMS) for a Wi-Fi access point (Wi-Fi AP) and a path with the interface selection information. The interface selection information of the Wi-Fi AP6 315 comprises, for example, Wi-Fi AP6, −55 dBm, 25 dB, and 0 for the service set identifier (SSID), the received signal strength indicator (RSSI), the signal-to-interference-plus-noise ratio (SINR), and the number of missed beacons, respectively. Similarly, for the Wi-Fi AP7 316, the interface selection information comprises, for example, Wi-Fi AP7, −95 dBm, 0 dB, and 50 for the SSID, the RSSI, the SINR, and the number of missed beacons, respectively. The quality of service (QoS) requirements of the data packets are, for example, 2 Mbps, 4 Mbps, 1, and 300 ms for the guaranteed bit rate for transmission of the data packets, a maximum bit rate for transmission of the data packets, priority of the data packets, and latency budget available to the data packets, respectively.

The wireless access interface selection and monitoring system (WAISMS) measures the latency for the specific bearer on the S1-U interface 311 by performing an internet control message protocol (ICMP) echo procedure with the core network 309 through the Wi-Fi access point (Wi-Fi AP), that is, the Wi-Fi AP1 302. The WAISMS measures the latency, for example, as 50 ms. The WAISMS measures the latency for the listed Wi-Fi APs, that is, the Wi-Fi AP6 315 and the Wi-Fi AP7 316 over the Wi-Fi interfaces 318g and 318h by performing an ICMP echo procedure with each of the Wi-Fi APs 315 and 316, for example, as 150 ms and 300 ms, respectively. The WAISMS also receives the network node information pertaining to data rates supported by the Wi-Fi APs, that is, the Wi-Fi AP6 315 and the Wi-Fi AP7 316 as 4 Mbps and 20 Mbps, respectively. This network node information exemplarily shows that the Wi-Fi AP7 316 is experiencing poor signal quality and is probably not covering the part of the executive tier where the user device 301 is located. The WAISMS determines that from the latency budget of 300 ms available to the data packets, transmitting the data packets on the S1-U interface 311 between the long term evolution (LTE) eNodeB 306 and the core network 309 consumes, for example, 50 ms. Therefore, only 250 ms of the latency budget is available to route the data packets from the LTE eNodeB 306 to the user device 301. The WAISMS measures the latency for the data packets to reach the Wi-Fi AP7 316 over the Wi-Fi interfaces 318h, 318f, and 318d, for example, as 300 ms, which exceeds the available 250 ms of the latency budget. Therefore, the WAISMS does not select the Wi-Fi AP7 316 and the associated Wi-Fi interface 318b since the signal quality is poor and the latency exceeds the latency budget. The WAISMS measures the latency for the data packets to reach the Wi-Fi AP, that is, the Wi-Fi AP6 315 over the Wi-Fi interfaces 318g, 318e, and 318c as 150 ms, which is within the available 250 ms of the latency budget. Furthermore, the signal quality reported by the user device 301 for the Wi-Fi AP6 315 is good. The data capacity available in the Wi-Fi AP6 315 is also sufficient to cater to the maximum data rate of 4 Mbps required by the bearer of the LTE interface 312a.

The wireless access interface selection and monitoring system (WAISMS) positively acknowledges the request from the cellular wireless access data offload system (CWADOS), indicates the Wi-Fi access point (Wi-Fi AP)6 315 to be the Wi-Fi AP selected for data offload, and indicates the first Wi-Fi interface 318a and the second Wi-Fi interface between the LTE eNodeB 306 and the second Wi-Fi AP, that is, the Wi-Fi AP2 303 to be the Wi-Fi interface 318g. The path to reach the Wi-Fi AP6 315 from the Wi-Fi AP2 303 is via the Wi-Fi interfaces 318e and 318c traversing the Wi-Fi daisy chain network 314b. The selected path defined by the Wi-Fi interfaces 318g, 318e, 318c, and 318a allows owners of the stadium to offer a reliable wireless connection to patrons of the executive tier even when it is not possible to locate an LTE eNodeB 306 in the executive tier and even when it is not possible to draw cables to the executive tier by allowing the LTE eNodeB 306 to offload data to the Wi-Fi AP2 303 that is offering coverage to the executive tier over the Wi-Fi daisy chain network 314b. Such a Wi-Fi daisy chain network 314b allows stadium owners to offer an enhanced wireless connection experience to their patrons even when the cost of locating the LTE eNodeBs, for example, the LTE eNodeB 306 in or drawing cables to a particular location is prohibitive, by deploying the ad hoc Wi-Fi daisy chain network 314b of the Wi-Fi APs 303, 304, 305, 308, 315, and 316.

Figure 4:
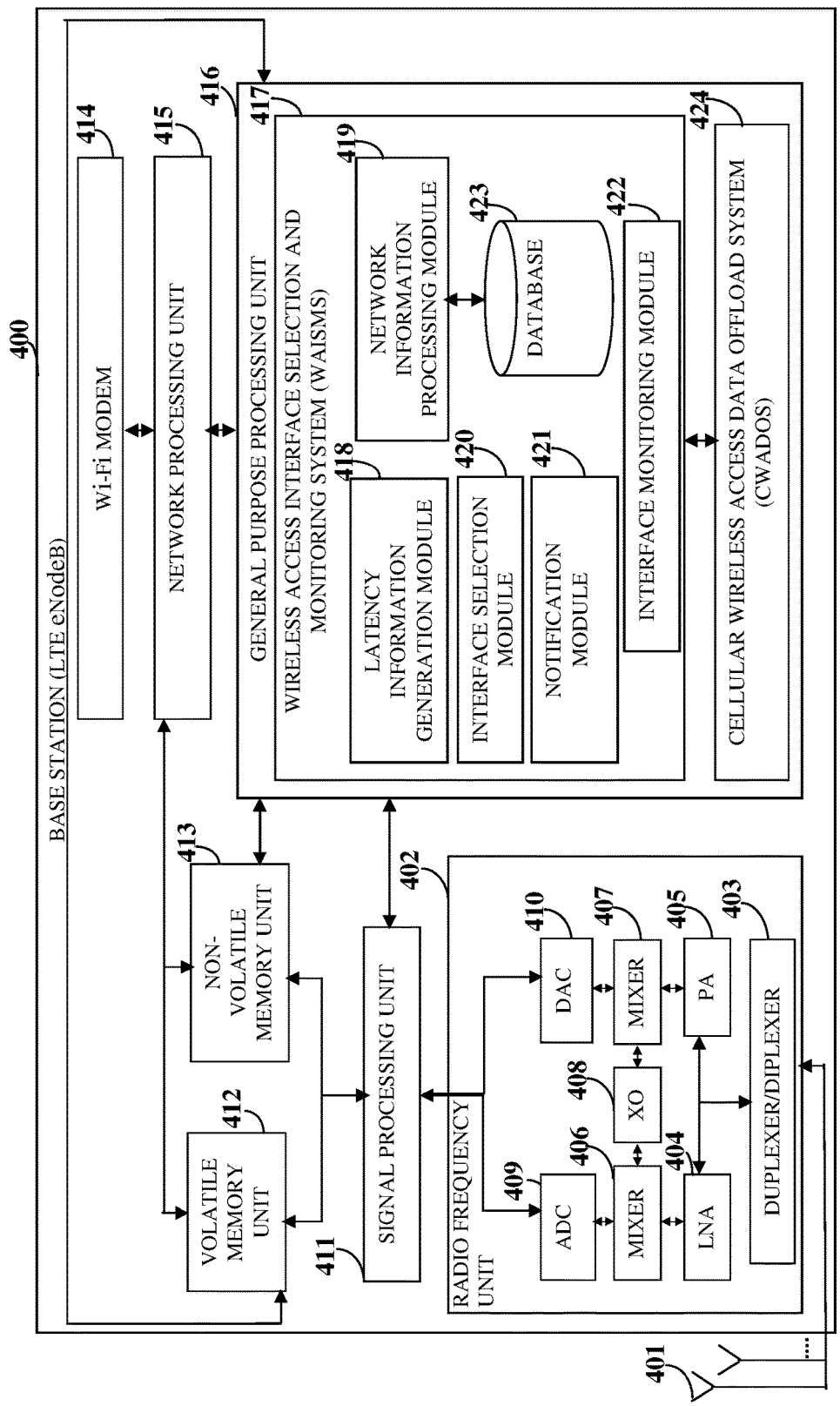
FIG. 4 exemplarily illustrates a block diagram of a base station comprising the wireless access interface selection and monitoring system for dynamically selecting and monitoring one or more wireless communication interfaces associated with one or more of multiple wireless access points in a wireless access network for offloading data from a cellular wireless communication interface between a user device and a base station in a cellular wireless communication network to the selected wireless communication interfaces.

FIG. 4 exemplarily illustrates a block diagram of the base station 400 comprising the wireless access interface selection and monitoring system (WAISMS) 417 for dynamically selecting and monitoring one or more wireless communication interfaces associated with one or more of multiple wireless access points, for example, 302, 303, 304, 305, 308, etc., in a wireless access network 314 for offloading data from a cellular wireless communication interface between a user device 301 exemplarily illustrated in FIGS. 3A-3C, and the base station 400 in a cellular wireless communication network to the selected wireless communication interfaces. As used herein, the wireless communication interfaces, the wireless access points, for example, 302, 303, 304, 305, 308, etc., the wireless access network 314, the cellular wireless communication interface, for example, 312a, and the cellular wireless communication network, for example, 313 are hereafter referred to as "Wi-Fi interfaces", "Wi-Fi access points (Wi-Fi APs)", the "Wi-Fi access network", the "long term evolution (LTE) interface", and the "LTE network" respectively. The base station 400 is an LTE evolved NodeB (LTE eNodeB), for example, the LTE eNodeB1 306 exemplarily illustrated in FIG. 3A. The Wi-Fi interfaces hereafter considered for purposes of illustration are the Wi-Fi interfaces 310a, 310b, 310c, 310d, 310e, 310f, 310g, 310h, 310i, and 310j exemplarily illustrated in FIG. 3A, and the Wi-Fi APs hereafter considered for purposes of illustration are the Wi-Fi APs 302, 303, 304, 305, and 308 of the Wi-Fi access network 314 exemplarily illustrated in FIG. 3A.

As exemplarily illustrated in FIG. 4, the base station 400 disclosed herein comprises one or more antennas 401, a radio frequency (RF) unit 402, multiple processors such as a signal processing unit 411, a network processing unit 415, and a general purpose processing unit 416, the wireless access interface selection and monitoring system (WAISMS) 417 executable by at least one processor, for example, 416, and non-transitory computer readable storage media comprising, for example, a volatile memory unit 412 and a non-volatile memory unit 413. As used herein, "non-transitory computer readable storage media" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processors 411, 415, and 416. The non-transitory computer readable storage media is communicatively coupled to the processors 411, 415, and 416 and configured to store computer program instructions defined by the modules 418, 419, 420, 421, 422, 423, etc., of the WAISMS 417. At least one of the processors 411, 415, and 416 execute the defined computer program instructions. In an embodiment, each of the modules, for example, 401, 402, 411, 412, 413, 414, 415, and 416 of the base station 400 is implemented on an independent integrated circuit (IC) or in an independent set of ICs mounted on separate printed circuit boards (PCBs) that are interconnected or implemented as functional blocks in an integrated System-on-Chip (SoC).

The radio frequency unit 402 is operably coupled to one or more antennas 401 of the base station 400. The radio frequency unit 402 is a hardware module that performs the functions of converting signals between digital and analog forms, modulation, frequency conversion, amplification, filtering, and transmission and reception of radio frequency electromagnetic waves via one or more antennas 401. The radio frequency unit 402 transmits and receives radio frequency electromagnetic waves via the antennas 401, and processes radio frequency signals transmitted and received via the antennas 401. As exemplarily illustrated in FIG. 4, the radio frequency unit 402 comprises a duplexer and/or a diplexer 403, a low noise amplifier (LNA) 404, a power amplifier (PA) 405, mixers 406 and 407, a crystal oscillator (XO) 408, a digital to analog converter (DAC) 410, and an analog to digital converter (ADC) 409 for processing the radio frequency signals. The duplexer and/or the diplexer 403 in the radio frequency unit 402 enables the antennas 401 to transmit and receive radio frequency signals simultaneously and transmit and receive radio frequency signals of different frequencies. The low noise amplifier 404 amplifies the radio frequency signals received from the antennas 401 via the duplexer and/or the diplexer 403 and communicates the amplified radio frequency signals to the mixer 406. The power amplifier 405 converts a low-power radio frequency signal into a radio frequency signal of significant power for driving the antennas 401 of the base station 400 to transmit radio frequency signals. The mixers 406 and 407 of the radio frequency unit 402 convert the radio frequency signals from one frequency band to another frequency band for optimizing transmission and reception by the antennas 401 and further signal processing. The crystal oscillator 408 in the radio frequency unit 402 interacts with the mixers 406 and 407 for converting the radio frequency signal from one frequency band to another frequency band. The digital to analog converter 410 performs digital to analog conversion of the radio frequency signals and communicates the converted radio frequency signals to the mixer 407. The analog to digital converter 409 performs analog to digital conversion of the mixed radio frequency signals and communicates the converted radio frequency signals to the signal processing unit 411.

The processors 411, 415, and 416 of the base station 400 refer to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processors 411, 415, and 416 are selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The wireless access interface selection and monitoring system (WAISMS) 417 disclosed herein is not limited to employing the processors 411, 415, and 416. In an embodiment, the WAISMS 417 employs one or more controllers or microcontrollers. At least one of the processors 411, 415, and 416 execute the computer program instructions defined by the WAISMS 417. The signal processing unit 411 is communicatively coupled to the radio frequency unit 402. The signal processing unit 411 communicates with the radio frequency unit 402, modulates and demodulates the converted radio frequency signals from the analog to digital converter 409 and the digital to analog converter 410, and implements computation intensive software functions involving extensive mathematical functions. The network processing unit 415 processes data packets received from the core network 309 exemplarily illustrated in FIG. 3A, and data packets to be transmitted to the core network 309. The general purpose processing unit 416 is communicatively coupled to the radio frequency unit 402 via the signal processing unit 411. The general purpose processing unit 416 executes software instructions that involve moving memory from one storage location to another storage location, comparisons, and implementation of interface selection logic.

In an embodiment as exemplarily illustrated in FIG. 4, the wireless access interface selection and monitoring system (WAISMS) 417 is implemented in the general purpose processing unit 416. The WAISMS 417 is communicatively coupled to the cellular wireless access data offload system (CWADOS) 424. In an embodiment as exemplarily illustrated in FIG. 4, the CWADOS 424 is a separate module located in the general purpose processing unit 416 of the base station 400 along with the WAISMS 417. In an embodiment (not shown), the CWADOS 424 is external to the base station 400 and communicatively coupled to the WAISMS 417. The CWADOS 424 offloads data from the long term evolution (LTE) interface, for example, 312a to one or more of the Wi-Fi interfaces 310a, 310b, 310c, 310d, 310e, 310f, 310g, 310h, and 310j exemplarily illustrated in FIG. 3A. In an embodiment, the WAISMS 417 is an integral part of the CWADOS 424 in the base station 400. The WAISMS 417 is implemented in software and hardware in the base station 400 and configures the network processing unit 415 to directly communicate with a Wi-Fi modulator-demodulator (modem) 414 integrated into the base station 400. The Wi-Fi modem 414 provides a Wi-Fi backhaul connection between the base station 400 and the core network 309. The WAISMS 417 dynamically selects and monitors the Wi-Fi interfaces 310a, 310b, 310c, 310d, 310e, 310f, 310g, 310h, 310i, and 310j associated with the Wi-Fi access points 302, 303, 304, and 305 in the Wi-Fi access network 314 for allowing the CWADOS 424 to offload the data from the LTE interface, for example, 312a between the user device 301 and the base station 400 in the LTE network 313 exemplarily illustrated in FIG. 3A.

The wireless access interface selection and monitoring system (WAISMS) 417 comprises a latency information generation module 418, a network information processing module 419, an interface selection module 420, a notification module 421, an interface monitoring module 422, and a database 423. The latency information generation module 418 generates network latency information by measuring latency on the cellular wireless network interface between the base station 400 and the core network 309 of the LTE network 313 for each bearer on the cellular wireless network interface using one or more network protocol procedures after establishing a bearer on the cellular wireless network interface. As used herein, "cellular wireless network interface" refers to the user plane of an S1 interface between the base station 400 and the core network 309 and is hereafter referred to as the "S1-U interface". The base station 400 is connected to the core network 309 over the Wi-Fi access network 314. The bearer of the S1-U interface 311 exemplarily illustrated in FIG. 3A, is referred to as an "S1-U bearer". The base station 400 is connected to the core network 309 over the Wi-Fi access network 314. The Wi-Fi modulator-demodulator (modem) 414 in the base station 400 provides a wireless backhaul connection between the base station 400 and the core network 309. That is, the Wi-Fi modem 414 allows the Wi-Fi interfaces 310*j* and 311*a* associated with the Wi-Fi APs 305 and 308 respectively, to perform a backhaul function to the core network 309 from the base station 400, for example, the LTE evolved node B1 (LTE eNodeB1) 306 exemplarily illustrated in FIG. 3A. In an embodiment, the measurement of latency by the latency information generation module 418 is implemented in hardware to reduce the processing load on the general purpose processing unit 416.

The network information processing module 419 receives and stores network node information from each of the Wi-Fi access points (Wi-Fi APs) 302, 303, 304, and 305 in the Wi-Fi access network 314 over a wireless communication protocol, for example, a user datagram protocol (UDP), a transmission control protocol (TCP), or an internet protocol (IP). The network information processing module 419 stores the received network node information in the database 423. The latency information generation module 418 dynamically updates the generated network latency information by measuring latency between the base station 400 and each of the Wi-Fi APs 302, 303, 304, and 305 in the Wi-Fi access network 314 using the received and stored network node information and one or more network protocol procedures. The latency information generation module 418 measures the latency on the Wi-Fi interfaces 310*a*, 310*b*, 310*c*, 310*d*, 310*e*, 310*f*, 310*g*, 310*h*, 310*i*, and 310*j* between the base station 400 and each of the Wi-Fi APs 302, 303, 304, and 305.

The cellular wireless access data offload system (CWADOS) 424 transmits a request with interface selection information to the wireless access interface selection and monitoring system (WAISMS) 417 for offloading of data to the Wi-Fi interfaces 310*a*, 310*b*, and 310*c* via the Wi-Fi interfaces 310*d*, 310*e*, 310*f*, 310*g*, 310*h*, 310*i*, and 310*j*. The network information processing module 419 of the WAISMS 417 receives and processes the request comprising the interface selection information from the CWADOS 424. The network information processing module 419 receives the request to select a Wi-Fi access point 302, 303, or 304 and an associated Wi-Fi interface 310*a*, 310*b*, or 310*c* from the CWADOS 424 for offloading data packets from the long term evolution (LTE) interface, for example, 312*a* in the LTE network 313 to the Wi-Fi interfaces 310*a*, 310*b*, and 310*c*, via the Wi-Fi interfaces 310*d*, 310*e*, 310*f*, 310*g*, 310*h*, 310*i*, and 310*j* in the Wi-Fi access network 314.

The interface selection module 420 selects a first Wi-Fi interface 310*a*, 310*b*, or 310*c* between the user device 301 and a Wi-Fi access point (Wi-Fi AP) 302, 303, or 304 in the Wi-Fi access network 314, and a single second Wi-Fi interface between another Wi-Fi AP, for example, the Wi-Fi AP4 305 in the Wi-Fi access network 314 exemplarily illustrated in FIG. 3A, and the base station 400 based on predetermined interface selection criteria and the interface selection information for offloading data packets. The first Wi-Fi interface refers to a Wi-Fi interface 310*a*, 310*b*, or 310*c* visible to the user device 301 and connects the user device 301 to the Wi-Fi AP 302, 303, or 304. The second Wi-Fi interface refers to the immediate Wi-Fi interface 310*j* that connects the base station 400 to another Wi-Fi AP, for example, the Wi-Fi AP4 305 to which downlink data packets need to be forwarded. The other Wi-Fi AP, for example, the Wi-Fi AP4 305 is hereafter referred to as the "second Wi-Fi AP".

As exemplarily illustrated in FIG. 3A, the Wi-Fi interfaces 310*a*, 310*b*, and 310*c* are the first Wi-Fi interfaces of the Wi-Fi access points (Wi-Fi APs) 302, 303, and 304 respectively, and the Wi-Fi interface 310*j* is the second Wi-Fi interface associated with the second Wi-Fi AP 305. The interface selection module 420 evaluates the Wi-Fi interfaces 310*a*, 310*b*, 310*c*, and 310*j* for satisfying the predetermined interface selection criteria based on the received interface selection information. For example, the interface selection module 420 evaluates the Wi-Fi interfaces 310*a* and 310*j* on the basis of the latency of the Wi-Fi interfaces 310*a* and 310*j*, the number of missed beacons on the Wi-Fi interface 310*a*, the received signal strength indicator (RSSI), and the signal-to-interference-plus-noise ratio (SINR) of the Wi-Fi interface 310*a*, and the data load on the Wi-Fi interface 310*j*. If the parameters of the Wi-Fi interfaces 310*a* and 310*j* are within the permissible limits of the bearer of the data packets to be routed, the interface selection module 420 selects the Wi-Fi interfaces 310*a* and 310*j* for routing the data packets between the user device 301 and the base station 400. In an example, the wireless access interface selection and monitoring system (WAISMS) 417 selects the Wi-Fi interface 310*j* as the second Wi-Fi interface on which the data packets have to be forwarded and the Wi-Fi interface 310*a* as the first Wi-Fi interface to which the user device 301 has to connect. The WAISMS 417 therefore selects the Wi-Fi APs 302 and 305 for forwarding the data packets. The Wi-Fi AP4 305 has multiple paths available to route the data packets to the Wi-Fi AP1 302 as disclosed in the detailed description of FIG. 3A. The Wi-Fi AP4 305 supports routing functionality and selects a route for forwarding the data packets based on the load of the associated Wi-Fi interfaces 310*d*, 310*e*, 310*f*, 310*g*, and 310*h* to reach the Wi-Fi AP1 302. For example, if the Wi-Fi AP4 305 decides to route data packets via the Wi-Fi interface 310*g*, the route to forward the data packets from the base station 400 to the user device 301 comprises the Wi-Fi interfaces 310*g* and 310*a*.

The notification module 421 generates and transmits a notification of the selected first Wi-Fi interface 310*a* and the selected second Wi-Fi interface 310*j* to the cellular wireless access data offload system (CWADOS) 424 to allow the CWADOS 424 to offload downlink data packets to the selected first Wi-Fi interface 310*a* via the selected second Wi-Fi interface 310*j*. The notification module 421 responds to the request from the CWADOS 424 with a positive acknowledgement to the CWADOS 424 and indicates the selected first Wi-Fi interface 310*a* and the second Wi-Fi interface 310*j* along with the Wi-Fi APs 305 and 302 to the CWADOS 424 to offload downlink data packets in the long term evolution (LTE) network 313 from the LTE interface, for example, 312*a*. For uplink data packets, the CWADOS 424 instructs the user device 301 to forward the uplink data packets on the selected first Wi-Fi interface, for example, 310*a* of the Wi-Fi AP1 302 and the second Wi-Fi interface, for example, 310*j* to the base station 400. When the Wi-Fi AP4 305 receives the downlink data packets on the Wi-Fi interface 310*j*, the first preference of the Wi-Fi AP4 305 is to forward the downlink data packets, for example, to the Wi-Fi AP1 302 on the Wi-Fi interface 310*g* directly. If the Wi-Fi AP4 305 finds that the Wi-Fi interface 310*g* is overloaded, then the Wi-Fi AP4 305 selects alternate routes.

The interface monitoring module 422 iteratively monitors the Wi-Fi interfaces 310*a*, 310*b*, 310*c*, and 310*j* associated with the Wi-Fi access points (Wi-Fi APs) 302, 303, 304, and 305 in the Wi-Fi access network 314 and instructs the latency information generation module 418 to dynamically update the network latency information for selection of subsequent Wi-Fi interfaces 310a, 310b, 310c, 310d, 310e, 310f, 310g, 310h, and 310j in the Wi-Fi access network 314 by the interface selection module 420 for offloading the downlink data packets by the cellular wireless access data offload system (CWADOS) 424. The interface monitoring module 422 performs continuous evaluation of the Wi-Fi interfaces 310a, 310b, 310c, and 310j based on the predetermined interface selection criteria whenever the network information processing module 419 receives the interface selection information and the network node information. The latency information generation module 418 dynamically updates the network latency information based on the selected Wi-Fi APs 302, 303, 304, and 305 and the associated Wi-Fi interfaces 310a, 310b, 310c, 310d, 310e, 310f, 310g, 310h, and 310j. On continuous evaluation of the Wi-Fi APs 302, 303, 304, and 305 and the associated Wi-Fi interfaces 310a, 310b, 310c, 310d, 310e, 310f, 310g, 310h, and 310j, if a Wi-Fi AP 302, 303, 304, or 305 and the associated Wi-Fi interfaces 310a, 310b, 310c, and 310j fail to satisfy the predetermined interface selection criteria, the notification module 421 generates and transmits a notification of failure of the Wi-Fi interfaces 310a, 310b, 310c, and 310j associated with the Wi-Fi APs 302, 303, 304, and 305 to satisfy the predetermined interface selection criteria to the CWADOS 424 based on the dynamically updated network latency information.

The database 423 can be, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the database 423 can also be locations on a file system in the volatile memory unit 412. In another embodiment, the database 423 can be remotely accessed by the wireless access interface selection and monitoring system (WAISMS) 417. In another embodiment, the database 423 is configured as a cloud based database implemented in a cloud computing environment.

The volatile memory unit 412 and the non-volatile memory unit 413 are used for storing programs, applications, and data. For example, the instructions defined by the latency information generation module 418, the network information processing module 419, the interface selection module 420, the notification module 421, and the interface monitoring module 422 of the wireless access interface selection and monitoring system (WAISMS) 417 are stored in the volatile memory unit 412 and the non-volatile memory unit 413 of the wireless access interface selection and monitoring system (WAISMS) 417. The volatile memory unit 412 and the non-volatile memory unit 413 are, for example, a random access memory (RAM) or another type of dynamic storage device that stores information and instructions for execution by the signal processing unit 411, the general purpose processing unit 416, and the network processing unit 415. The volatile memory unit 412 and the non-volatile memory unit 413 also store temporary variables and other intermediate information used during execution of the instructions by the signal processing unit 411, the general purpose processing unit 416, and the network processing unit 415. In an embodiment, the base station 400 further comprises a read only memory (ROM) or another type of static storage device that stores static information and instructions for the signal processing unit 411, the general purpose processing unit 416, and the network processing unit 415.

Disclosed herein is also a non-transitory computer readable storage medium that stores computer program codes comprising instructions executable by one or more processors comprising the signal processing unit 411, the general purpose processing unit 416, and the network processing unit 415 for dynamically selecting and monitoring Wi-Fi interfaces 310a, 310b, 310c, 310d, 310e, 310f, 310g, 310h, and 310j associated with Wi-Fi access points (Wi-Fi APs) 302, 303, 304, and 305 in the Wi-Fi access network 314 exemplarily illustrated in FIG. 3A, for offloading data from the long term evolution (LTE) interface, for example, the LTE interface 312a between the user device 301 and the base station 400 in the LTE network 313 to the selected Wi-Fi interfaces 310a, 310b, 310c, 310d, 310e, 310f, 310g, 310h, and 310j. The computer program codes comprise a first computer program code for generating network latency information by measuring latency on an S1-U interface 311 between the base station 400 and the core network 309 of the LTE network 313 for each bearer on the S1-U interface 311 using one or more network protocol procedures after establishing a bearer on the S1-U interface 311; a second computer program code for receiving and storing network node information from each of the Wi-Fi APs 302, 303, 304, and 305, in the Wi-Fi access network 314 over a wireless communication protocol; a third computer program code for dynamically updating the generated network latency information by measuring latency between the base station 400 and each of the Wi-Fi APs 302, 303, 304, and 305 in the Wi-Fi access network 314 using the received and stored network node information and one or more network protocol procedures; a fourth computer program code for receiving and processing a request comprising interface selection information from the cellular wireless access data offload system (CWADOS) 424; a fifth computer program code for selecting a first Wi-Fi interface 310a, 310b, or 310c between the user device 301 and a Wi-Fi AP 302, 303, or 304 in the Wi-Fi access network 314, and a second Wi-Fi interface 310j between another Wi-Fi AP, for example, the Wi-Fi AP4 305 in the Wi-Fi access network 314 and the base station 400 based on the predetermined interface selection criteria and the interface selection information for offloading data packets; a sixth computer program code for generating and transmitting a notification of the selected first Wi-Fi interface 310a, 310b, or 310c, and the selected second Wi-Fi interface 310j to the CWADOS 424 to allow the CWADOS 424 to offload downlink data packets to the selected first Wi-Fi interface 310a, 310b, or 310c via the selected second Wi-Fi interface 310j; and a seventh computer program code for iteratively monitoring the Wi-Fi interfaces 310a, 310b, 310c, 310d, 310e, 310f, 310g, 310h, and 310j associated with the Wi-Fi APs 302, 303, 304, and 305 in the Wi-Fi access network 314. The third computer program code further comprises an eighth computer program code for dynamically updating the dynamically updated network latency information for selection of subsequent Wi-Fi interfaces 310a, 310b, 310c, 310d, 310e, 310f, 310g, 310h, and 310j in the Wi-Fi access network 314 for offloading the downlink data packets.

The computer program codes embodied on the non-transitory computer readable storage medium disclosed herein further comprise one or more additional computer program codes for performing additional steps that may be required and contemplated for dynamically selecting and monitoring one or more of the Wi-Fi interfaces 310a, 310b, 310c, 310d, 310e, 310f, 310g, 310h, and 310j associated with one or more of the Wi-Fi access points (Wi-Fi APs) 302, 303, 304, and 305 in the Wi-Fi access network 314 for offloading data from the long term evolution (LTE) interface, for example, 312a between the user device 301 and the base station 400 in the LTE network 313 to the selected Wi-Fi interfaces 310a, 310b, 310c, and 310j. In an embodiment, a single piece of computer program code comprising computer executable instructions performs one or more steps of the method disclosed herein for dynamically selecting and monitoring one or more of the Wi-Fi interfaces 310a, 310b, 310c, 310d, 310e, 310f, 310g, 310h, and 310j associated with one or more of the Wi-Fi APs 302, 303, 304, and 305 in the Wi-Fi access network 314 for offloading data from the LTE interface, for example, 312a between the user device 301 and the base station 400 in the LTE network 313 to the selected Wi-Fi interfaces 310a, 310b, 310c, and 310j. At least one of the processors 411, 415, and 416, for example, the general purpose processing unit 416 of the base station 400 retrieves the computer executable instructions of the computer program codes and execute them. When the computer executable instructions are executed by the general purpose processing unit 416, the computer executable instructions cause the general purpose processing unit 416 to perform the steps of the method for dynamically selecting and monitoring one or more of the Wi-Fi interfaces 310a, 310b, 310c, 310d, 310e, 310f, 310g, 310h, and 310j associated with one or more of the Wi-Fi APs 302, 303, 304, and 305 in the Wi-Fi access network 314 for offloading data from the LTE interface, for example, 312a between the user device 301 and the base station 400 in the LTE network 313 to the selected Wi-Fi interfaces 310a, 310b, 310c, and 310j.

The method disclosed herein, employing the wireless access interface selection and monitoring system (WAISMS) 417, improves the overall service offered by the long term evolution (LTE) and Wi-Fi access network based communication system 300 exemplarily illustrated in FIGS. 3A-3C, in challenging scenarios. The WAISMS 417 also improves the efficiency and reliability of the elements in the LTE network 313 that are modified, by avoiding congestion. The method disclosed herein technically effects the functionality of hardware of the base station 400, for example, the base station 400 and contributes to the data offloading process carried on outside a generic computer. The WAISMS 417 contributes to the coverage and capacity of the LTE and Wi-Fi access network based communication system 300 and allows increased coverage and capacity in challenging locations where a wired connection is not available to all elements of the LTE and Wi-Fi access network based communication system 300, while not compromising the quality of service offered by the LTE and Wi-Fi access network based communication system 300.

The method disclosed herein, employing the wireless access interface selection and monitoring system (WAISMS) 417, allows an integration of the Wi-Fi modulator-demodulator (modem) 414 into the base station 400 as exemplarily illustrated in FIG. 4. The WAISMS 417 allows the load of the base station 400 within the long term evolution (LTE) and Wi-Fi access network based communication system 300 exemplarily illustrated in FIG. 3A, to be managed by offloading data traffic to the Wi-Fi access points (Wi-Fi APs) 302, 303, 304, and 305. Offloading data traffic allows the base station 400 to serve more users and offer a larger aggregate throughput across all users. The base station 400 can operate even when there is no wired connection to the Wi-Fi APs 302, 303, 304, and 305 in the LTE and Wi-Fi access network based communication system 300.

It will be readily apparent in different embodiments that the various methods, algorithms, and computer programs disclosed herein are implemented on non-transitory computer readable storage media appropriately programmed for the wireless access interface selection and monitoring system (WAISMS) 417 exemplarily illustrated in FIG. 4. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, a stack oriented programming language, Python®, etc. Other object-oriented, functional, scripting, and/or logical programming languages can also be used. In an embodiment, the computer program codes or software programs are stored on or in one or more mediums as object code. In another embodiment, various aspects of the long term evolution (LTE) and Wi-Fi access network based communication system 300 exemplarily illustrated in FIGS. 3A-3C, are implemented as programmed elements, or non-programmed elements, or any suitable combination thereof.

Where databases are described such as the database 423, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the LTE and Wi-Fi access network based communication system 300, the databases are integrated to communicate with each other for enabling simultaneous updates of data linked across the databases, when there are any updates to the data in one of the databases.

The method and the LTE and Wi-Fi access network based communication system 300 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the long term evolution (LTE) and Wi-Fi access network based communication system 300 disclosed herein are not limited to a particular computer system platform, processor, operating system, or network. In an embodiment, one or more aspects of the method and the LTE and Wi-Fi access network based communication system 300 disclosed herein are distributed among one or more computer systems, for example, servers configured to provide one or more services to one or more client computers, or to perform a complete task in a distributed system. For example, one or more aspects of the method and the LTE and Wi-Fi access network based communication system 300 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the LTE and Wi-Fi access network based communication system 300 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the LTE and Wi-Fi access network based communication system 300 disclosed herein. While the method and the LTE and Wi-Fi access network based communication system 300 have been described with reference to various embodiments, it is understood that the words, which have been used herein, are words of description and illustration, rather than words of limitation. Further, although the method and the LTE and Wi-Fi access network based communication system 300 have been described herein with reference to particular means, materials, and embodiments, the method and the LTE and Wi-Fi access network based communication system 300 are not intended to be limited to the particulars disclosed herein; rather, the method and the LTE and Wi-Fi access network based communication system 300 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the LTE and Wi-Fi access network based communication system 300 disclosed herein in their aspects.

I claim:

1. A method for dynamically selecting and monitoring one or more wireless communication interfaces associated with one or more of a plurality of wireless access points in a wireless access network for offloading data from a cellular wireless communication interface between a user device and a base station in a cellular wireless communication network to the selected one or more wireless communication interfaces, the method employing a wireless access interface selection and monitoring system communicatively coupled to a cellular wireless access data offload system and implemented in the base station of the cellular wireless communication network for performing the method comprising:

generating network latency information by measuring latency on a cellular wireless network interface between the base station and a core network of the cellular wireless communication network by the wireless access interface selection and monitoring system for each bearer on the cellular wireless network interface using one or more network protocol procedures, wherein the base station is connected to the core network over the wireless access network;

receiving and storing network node information from each of the wireless access points in the wireless access network over a wireless communication protocol by the wireless access interface selection and monitoring system;

dynamically updating the generated network latency information by measuring latency between the base station and the each of the wireless access points in the wireless access network by the wireless access interface selection and monitoring system using the received and stored network node information and the one or more network protocol procedures;

receiving and processing a request comprising interface selection information from the cellular wireless access data offload system by the wireless access interface selection and monitoring system;

selecting a first wireless communication interface between the user device and one of the wireless access points in the wireless access network, and a second wireless communication interface between another one of the wireless access points and the base station by the wireless access interface selection and monitoring system based on predetermined interface selection criteria and the interface selection information for offloading data packets;

generating and transmitting a notification of the selected first wireless communication interface and the selected second wireless communication interface to the cellular wireless access data offload system by the wireless access interface selection and monitoring system to allow the cellular wireless access data offload system to offload downlink data packets to the selected first wireless communication interface via the selected second wireless communication interface; and iteratively monitoring the one or more wireless communication interfaces associated with the wireless access points in the wireless access network and dynamically updating the dynamically updated network latency information by the wireless access interface selection and monitoring system for selecting subsequent wireless communication interfaces in the wireless access network for offloading the downlink data packets.

2. The method of claim 1, wherein the one or more network protocol procedures comprise an internet control message protocol echo procedure.

3. The method of claim 1, wherein the network node information comprises a unique identifier of the each of the wireless access points and data load on the one or more wireless communication interfaces associated with the each of the wireless access points.

4. The method of claim 1, wherein the interface selection information comprises a list of the wireless access points, measurements pertaining to the each of the wireless access points, and quality of service requirements of a bearer on the cellular wireless network interface for which the selection of the one or more wireless communication interfaces is required.

5. The method of claim 4, wherein the measurements pertaining to the each of the wireless access points comprise a received signal strength indicator, a signal-to-interference-plus-noise ratio, and number of missed beacons.

6. The method of claim 4, wherein the quality of service requirements of the bearer on the cellular wireless network interface for which the selection of the one or more wireless communication interfaces is required comprise a guaranteed bit rate, a maximum bit rate, a priority, and a latency budget.

7. The method of claim 1, wherein the predetermined interface selection criteria comprise a latency budget available for the data packets based on quality of service requirements of a bearer on the cellular wireless network interface for which the selection of the one or more wireless communication interfaces is required and the latency measured on the bearer for which the selection of the one or more wireless communication interfaces is required, latency of a shortest path available to the user device via the wireless access network, a received signal strength indicator, a signal-to-interference-plus-noise ratio, number of missed beacons of the one or more wireless communication interfaces, data load on the one or more wireless communication interfaces between the base station and the user device, and power consumption of the user device in communicating on the first wireless communication interface.

8. The method of claim 1, further comprising generating and transmitting a notification of failure of the one or more wireless communication interfaces to satisfy the predetermined interface selection criteria to the cellular wireless access data offload system by the wireless access interface selection and monitoring system based on the dynamically updated network latency information.

9. The method of claim 1, wherein a topology of the wireless access points in the wireless access network is one of a fully connected mesh topology, a partially connected mesh topology, a daisy chain topology, and a star topology.

10. The method of claim 1, wherein the cellular wireless communication interface is a long term evolution interface.

11. The method of claim 1, wherein the first wireless communication interface is a wireless local area network interface configured to connect the one of the wireless access points in the wireless access network to the user device.

12. The method of claim 1, wherein the second wireless communication interface is a wireless local area network interface between the another one of the wireless access points in the wireless access network and the base station.

13. The method of claim 1, wherein the wireless communication protocol for communicating with the each of the wireless access points is one of a user datagram protocol, a transmission control protocol, and an internet protocol.

14. The method of claim 1, wherein the base station of the cellular wireless communication network is an evolved node B.

15. The method of claim 1, wherein the cellular wireless network interface is an S1 interface of the cellular wireless communication network.

16. The method of claim 1, wherein the each bearer of the cellular wireless network interface is a user plane bearer on an S1 interface.

17. A base station for dynamically selecting and monitoring one or more wireless communication interfaces associated with one or more of a plurality of wireless access points in a wireless access network for offloading data from a cellular wireless communication interface between a user device and a base station in a cellular wireless communication network to the selected one or more wireless communication interfaces, the base station comprising:

one or more antennas;

a radio frequency unit operably coupled to the one or more antennas, the radio frequency unit configured to transmit and receive radio frequency electromagnetic waves via the one or more antennas;

one or more processors communicatively coupled to the radio frequency unit, wherein at least one of the one or more processors is configured to execute computer program instructions defined by a wireless access interface selection and monitoring system, the wireless access interface selection and monitoring system comprising:

a latency information generation module configured to generate network latency information by measuring latency on a cellular wireless network interface between the base station and a core network of the cellular wireless communication network for each bearer on the cellular wireless network interface using one or more network protocol procedures, wherein the base station is connected to the core network over the wireless access network;

a network information processing module configured to receive and store network node information from each of the wireless access points in the wireless access network over a wireless communication protocol;

the latency information generation module further configured to dynamically update the generated network latency information by measuring latency between the base station and the each of the wireless access points in the wireless access network using the received and stored network node information and the one or more network protocol procedures;

the network information processing module further configured to receive and process a request comprising interface selection information from a cellular wireless access data offload system communicatively coupled to the wireless access interface selection and monitoring system;

an interface selection module configured to select a first wireless communication interface between the user device and one of the wireless access points in the wireless access network, and a second wireless communication interface between another one of the wireless access points and the base station based on predetermined interface selection criteria and the interface selection information for offloading data packets;

a notification module configured to generate and transmit a notification of the selected first wireless communication interface and the selected second wireless communication interface to the cellular wireless access data offload system to allow the cellular wireless access data offload system to offload downlink data packets to the selected first wireless communication interface via the selected second wireless communication interface; and an interface monitoring module configured to iteratively monitor the one or more wireless communication interfaces associated with the wireless access points in the wireless access network and instruct the latency information generation module to dynamically update the dynamically updated network latency information for selection of subsequent wireless communication interfaces in the wireless access network by the interface selection module for offloading the downlink data packets by the cellular wireless access data offload system;

a wireless modulator-demodulator communicatively coupled to the at least one processor, the wireless modulator-demodulator configured to provide a wireless backhaul connection between the base station and the core network; and a non-transitory computer readable storage medium configured to store the computer program instructions defined by the wireless access interface selection and monitoring system.

18. The base station of claim 17, wherein the one or more network protocol procedures comprise an internet control message protocol echo procedure.

19. The base station of claim 17, wherein the network node information comprises a unique identifier of the each of the wireless access points and data load on the one or more wireless communication interfaces associated with the each of the wireless access points.

20. The base station of claim 17, wherein the interface selection information comprises a list of the wireless access points, measurements pertaining to the each of the wireless access points, and quality of service requirements of a bearer on the cellular wireless network interface for which the selection of the one or more wireless communication interfaces is required.

21. The base station of claim 20, wherein the measurements pertaining to the each of the wireless access points comprise a received signal strength indicator, a signal-to-interference-plus-noise ratio, and number of missed beacons.

22. The base station of claim 20, wherein the quality of service requirements of the bearer on the cellular wireless network interface for which the selection of the one or more wireless communication interfaces is required comprise a guaranteed bit rate, a maximum bit rate, a priority, and a latency budget.

23. The base station of claim 17, wherein the predetermined interface selection criteria comprise a latency budget available for the data packets based on quality of service requirements of a bearer on the cellular wireless network interface for which the selection of the one or more wireless communication interfaces is required and the latency measured on the bearer for which the selection of the one or more wireless communication interfaces is required, latency of a shortest path available to the user device via the wireless access network, a received signal strength indicator, a signal-to-interference-plus-noise ratio, number of missed beacons of the one or more wireless communication interfaces, data load on the one or more wireless communication interfaces between the base station and the user device, and power consumption of the user device in communicating on the first wireless communication interface.

24. The base station of claim 17, wherein the notification module is further configured to generate and transmit a notification of failure of the one or more wireless communication interfaces to satisfy the predetermined interface selection criteria to the cellular wireless access data offload system based on the dynamically updated network latency information.

25. The base station of claim 17, wherein a topology of the wireless access points in the wireless access network is one of a fully connected mesh topology, a partially connected mesh topology, a daisy chain topology, and a star topology.

26. The base station of claim 17, wherein the wireless communication protocol for communicating with the each of the wireless access points is one of a user datagram protocol, a transmission control protocol, and an internet protocol.

27. A non-transitory computer readable storage medium having embodied thereon, computer program codes comprising instructions executable by at least one processor for dynamically selecting and monitoring one or more wireless communication interfaces associated with one or more of a plurality of wireless access points in a wireless access network for offloading data from a cellular wireless communication interface between a user device and a base station in a cellular wireless communication network to the selected one or more wireless communication interfaces, the computer program codes comprising:

a first computer program code for generating network latency information by measuring latency on a cellular wireless network interface between the base station and a core network of the cellular wireless communication network for each bearer on the cellular wireless network interface using one or more network protocol procedures, wherein the base station is connected to the core network over the wireless access network;

a second computer program code for receiving and storing network node information from each of the wireless access points in the wireless access network over a wireless communication protocol;

a third computer program code for dynamically updating the generated network latency information by measuring latency between the base station and the each of the wireless access points in the wireless access network using the received and stored network node information and the one or more network protocol procedures;

a fourth computer program code for receiving and processing a request comprising interface selection information from a cellular wireless access data offload system;

a fifth computer program code for selecting a first wireless communication interface between the user device and one of the wireless access points in the wireless access network, and a second wireless communication interface between another one of the wireless access points and the base station based on predetermined interface selection criteria and the interface selection information for offloading data packets;

a sixth computer program code for generating and transmitting a notification of the selected first wireless communication interface and the selected second wireless communication interface to the cellular wireless access data offload system to allow the cellular wireless access data offload system to offload downlink data packets to the selected first wireless communication interface via the selected second wireless communication interface; and a seventh computer program code for iteratively monitoring the one or more wireless communication interfaces associated with the wireless access points in the wireless access network, wherein the third computer program code comprises an eighth computer program code for dynamically updating the dynamically updated network latency information for selection of subsequent wireless communication interfaces in the wireless access network for offloading the downlink data packets.

* * * * *